United States Patent
Zhang

(10) Patent No.: US 11,045,705 B2
(45) Date of Patent: Jun. 29, 2021

(54) METHODS AND SYSTEMS FOR 3D BALL TRAJECTORY RECONSTRUCTION

(71) Applicant: NEX Team Inc., San Jose, CA (US)

(72) Inventor: Qi Zhang, Tseung Kwan O (HK)

(73) Assignee: NEX Team Inc., San Jose, CA (US)

( * ) Notice: Subject to any disclaimer, the term of this patent is extended or adjusted under 35 U.S.C. 154(b) by 0 days.

(21) Appl. No.: 16/823,418

(22) Filed: Mar. 19, 2020

(65) Prior Publication Data

US 2020/0298080 A1    Sep. 24, 2020

Related U.S. Application Data

(60) Provisional application No. 62/820,720, filed on Mar. 19, 2019.

(51) Int. Cl.
*A63B 69/00* (2006.01)
*A63B 24/00* (2006.01)
(Continued)

(52) U.S. Cl.
CPC ...... *A63B 69/0071* (2013.01); *A63B 24/0021* (2013.01); *G06N 3/08* (2013.01);
(Continued)

(58) Field of Classification Search
CPC ........... G06K 9/00; G06T 11/60; G06T 19/00; A63B 57/00; A63B 67/02
See application file for complete search history.

(56) References Cited

U.S. PATENT DOCUMENTS

| 2008/0182685 A1* | 7/2008 | Marty | ................ A63B 24/0003 |
| | | | 473/407 |
| 2008/0312010 A1* | 12/2008 | Marty | .................... A63B 69/00 |
| | | | 473/447 |

(Continued)

OTHER PUBLICATIONS

Chen et al. "Ball tracking and 3D trajectory approximation with applications to tactics analysis from single-camera volleyball sequences", Multimed Tools Appl (2012) 60:641-667, 10.1007/s11042-011-0833-y.

(Continued)

*Primary Examiner* — Eugene L Kim
*Assistant Examiner* — Christopher Glenn
(74) *Attorney, Agent, or Firm* — American Patent Agency PC; Daniar Hussain; Xiaomeng Shi

(57) ABSTRACT

Methods and systems for 3D ball trajectory reconstruction are disclosed. The methods and systems perform steps of receiving a 2D ball trajectory, a shooter's on-ground foot location, and a camera projection matrix; generating on-ground trajectory line assumptions based on the shooter's on-ground foot location and the 2D trajectory; reconstructing a candidate 3D trajectory for each on-ground trajectory line assumption, by determining a ball height for each on-ground projection point in the on-ground trajectory line and by curve fitting; evaluating each candidate 3D trajectory and selecting one with a best score as the reconstructed 3D ball trajectory. Embodiments of the present invention enable a resource-limited mobile device such as a smartphone to conduct the aforementioned steps. Also disclosed are benefits of the new methods, and alternative embodiments of implementation.

20 Claims, 21 Drawing Sheets

(51) Int. Cl.
*G06T 7/207* (2017.01)
*G06T 7/73* (2017.01)
*G06N 3/08* (2006.01)

(52) U.S. Cl.
CPC .............. *G06T 7/207* (2017.01); *G06T 7/74* (2017.01); *A63B 2024/0031* (2013.01); *A63B 2024/0034* (2013.01); *A63B 2243/0037* (2013.01); *G06T 2207/30224* (2013.01); *G06T 2207/30241* (2013.01)

(56) References Cited

U.S. PATENT DOCUMENTS

| | | | | |
|---|---|---|---|---|
| 2010/0210377 | A1* | 8/2010 | Lock | A63B 24/0006 473/409 |
| 2010/0279800 | A1* | 11/2010 | Zuger | A63B 24/0021 473/459 |
| 2012/0220385 | A1* | 8/2012 | Richardson | A63F 13/812 473/156 |
| 2013/0095959 | A1* | 4/2013 | Marty | G06K 9/00342 473/431 |
| 2016/0121193 | A1 | 5/2016 | Marty et al. | |
| 2018/0075659 | A1* | 3/2018 | Browy | G06F 1/163 |
| 2018/0099201 | A1* | 4/2018 | Marty | G06K 9/00724 |
| 2018/0137662 | A1* | 5/2018 | Simeone | A63C 19/00 |
| 2018/0322337 | A1* | 11/2018 | Marty | G06T 7/20 |

OTHER PUBLICATIONS

Chen et al., "Physics-based ball tracking and 3D trajectory reconstruction with applications to shooting location estimation in basketball video", J. Vis. Commun. Image R. 20 (2009) 204-216.

Metzler et al., "3D Trajectory Reconstruction of the Soccer Ball for Single Static Camera Systems", MVA2013 IAPR International Conference on Machine Vision Applications, May 20-23, 2013, Kyoto, Japan.

Pfeifer et al., "Video capture and post-processing technique for approximating 3D projectile trajectory", Published in Sports Technology, 2016. DOI: 10.1080/19346182.2016.1248974.

Przednowek et al. "A System for Analysing the Basketball Free Throw Trajectory Based on Particle Swarm Optimization", Appl. Sci. 2018, 8, 2090; doi:10.3390/app8112090.

Shen et al., "3D reconstruction of ball trajectory from a single camera in the ball game". 392. 33-39. 10.1007/978-3-319-24560-7_5.

* cited by examiner

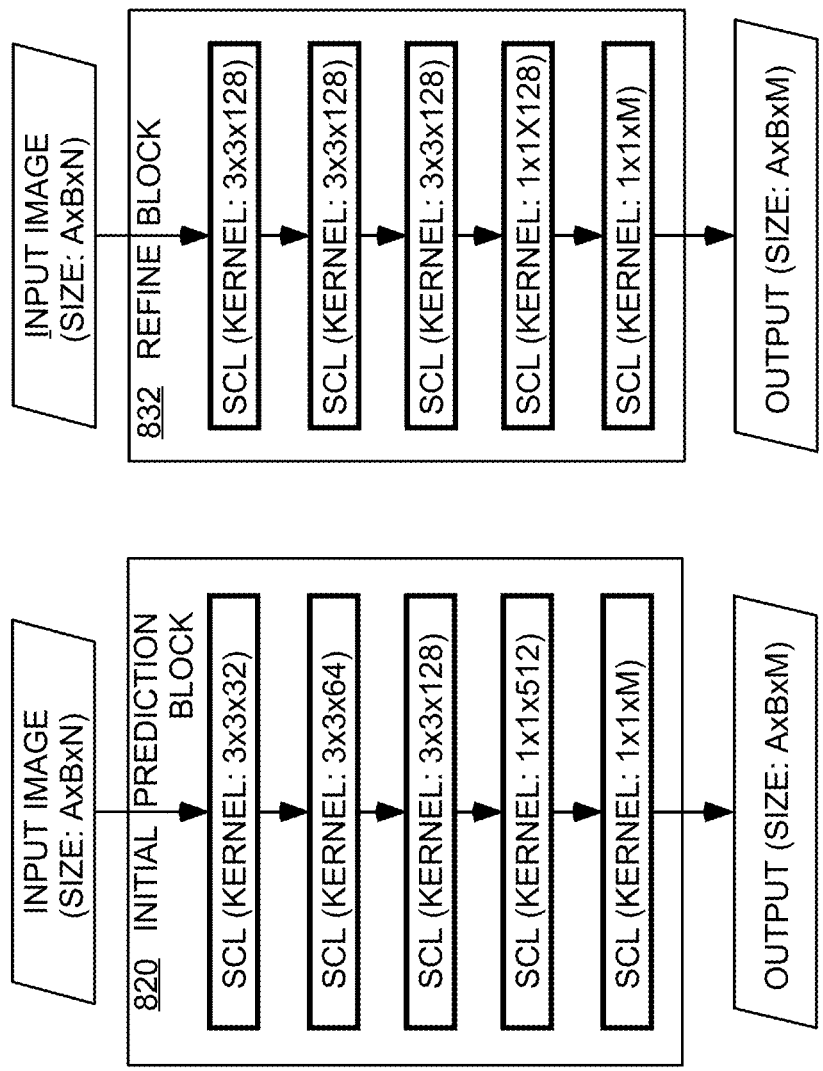

METHODS AND SYSTEMS FOR 3D BALL TRAJECTORY RECONSTRUCTION

REFERENCE TO RELATED APPLICATIONS

This application is a non-provisional of and claims priority to provisional U.S. Ser. No. 62/820,720, filed on Mar. 19, 2019, entitled "Methods and Systems for 3D Ball Trajectory Reconstruction."

This application is related to non-provisional U.S. Ser. No. 16/109,923, filed on 23 Aug. 2018, entitled "Methods and Systems for Ball Game Analytics with a Mobile Device", and issued on 26 Nov. 2019 as U.S. Pat. No. 10,489,656, and non-provisional U.S. Ser. No. 16/424,287, filed on 28 May 2019, entitled "Methods and Systems for Generating Sports Analytics with a Mobile Device". The entire disclosures of all above-referenced applications are hereby incorporated by reference in their entireties herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of computer vision and artificial intelligence-based sports analysis, and pertain particularly to methods and systems for 3D ball trajectory reconstruction and subsequent generation of shot analytics and game analytics, on a mobile device having a camera for game capturing.

BACKGROUND OF THE INVENTION

The statements in this section may serve as a background to help understand the invention and its application and uses, but may not constitute prior art.

Modern computing technology has brought in a new era of rapid real-time analysis of sports activities. Whether it's a viewer watching a game for leisure, a coach analyzing plays to adapt to the opposing team's strategy, or a general manager compiling data sets across multiple games to optimize player retention strategies, real-time analysis enables thorough quantitative game analysis by granting the viewer instantaneous access to statistical data of every single play. Sport analytics have seen uses in applications such as broadcasting, game strategizing, and team management, yet real-time analytic systems for mass mainstream usage is still complex and expensive. Real-time tracking technology based on image recognition often requires use of multiple high-definition cameras mounted on top of a game area or play field for capturing visual data from multiple camera arrays positioned at multiple perspectives, calibration for different environments, and massive processing power in high-end desktop and/or server-grade hardware to analyze the data from the camera arrays. Furthermore, accurate tracking of key events throughout the game, and analysis of object trajectories and player movements for game and player analytics generation often require vast resources including expensive equipment with complicated setups that prevent mass adaptation of both real-time and off-line sports analytic systems implemented with low-cost, general-purpose hardware having small form factors. In particular, for ball sports, understanding the 3D trajectory of a ball object in flight is often essential for examining player forms during ball launch, analyzing ball motions close to the goal, and predicting and evaluating ball shot attempt outcomes, yet without stereo video input, reconstruction of 3D projectiles often require depth information from dedicated sensors and/or complex triangulation techniques.

Therefore, in view of the aforementioned difficulties, there is an unsolved need to accurately detect and predict ball motion flow and trajectories, for use in the generation of shot science analytics, while maintaining minimal delay and data processing overheads, such that the system can be implemented on a single mobile computing device.

It is against this background that various embodiments of the present invention were developed.

BRIEF SUMMARY OF THE INVENTION

Methods, systems, and apparatuses are provided for ball motion flow and 3D trajectory detection, estimation, and prediction using a mobile computing device.

In one aspect, a method is provided for 3D ball trajectory reconstruction, comprising the steps of receiving a 2D trajectory in a 2D image space, a shooter's on-ground foot location, and a camera projection matrix; generating a plurality of on-ground trajectory lines based on the shooter's on-ground foot location and the 2D trajectory, where each on-ground trajectory line comprises a plurality of on-ground projection points, and where each on-ground projection point represents an on-ground projection of a 3D ball position; for each on-ground trajectory line, reconstructing a corresponding candidate 3D trajectory by determining, for each on-ground projection point in the on-ground trajectory line, a ball height from a ground plane, and by curve fitting; and reconstructing the 3D ball trajectory by selecting a candidate 3D trajectory with a best trajectory score.

In some embodiments, the method further comprises a step to determine the 2D trajectory in the 2D image space from an input video. In some embodiments, the input video was captured using a camera on a mobile computing device.

In some embodiments, each on-ground trajectory line enumerates a possible shooting direction from the shooter's foot location towards a goal. In some embodiments, each on-ground trajectory line enumerates a possible ball speed.

In some embodiments, each candidate 3D ball position in each candidate 3D trajectory, when projected onto the 2D image space, is within a threshold distance to a corresponding position of the ball in 2D image space.

In some embodiments, each ball height is determined by a search algorithm.

In some embodiments, the trajectory score is computed based on a back-projection to the 2D image space.

In some embodiments, the method further comprises a step to detect a goal, using a Convolutional Neural Network (CNN) module, by detecting one or more key feature points of the goal from the input video, where the CNN module has been trained using one or more prior input videos, and where each on-ground trajectory line is directed towards the goal.

In another aspect, another embodiment of the present invention is a system for 3D ball trajectory reconstruction, comprising at least one processor, and a non-transitory physical medium for storing program code and accessible by the processor, the program code when executed by the processor causes the processor to receive a 2D trajectory in a 2D image space, a shooter's on-ground foot location, and a camera projection matrix; generate a plurality of on-ground trajectory lines based on the shooter's on-ground foot location and the 2D trajectory, where each on-ground trajectory line comprises a plurality of on-ground projection points, and where each on-ground projection point represents an on-ground projection of a 3D ball position; for each on-ground trajectory line, reconstruct a corresponding candidate 3D trajectory by determining, for each on-ground projection point in the on-ground trajectory line, a ball height from a ground plane, and by curve fitting; and reconstruct the 3D ball trajectory by selecting a candidate 3D trajectory with a best trajectory score.

In yet another aspect, yet another embodiment of the present invention is a non-transitory computer-readable physical storage medium for reconstructing a 3D ball trajectory, the storage medium comprising program code stored thereon, that when executed by a processor causes the processor to receive a 2D trajectory in a 2D image space, a shooter's on-ground foot location, and a camera projection matrix; generate a plurality of on-ground trajectory lines based on the shooter's on-ground foot location and the 2D trajectory, where each on-ground trajectory line comprises a plurality of on-ground projection points, and where each on-ground projection point represents an on-ground projection of a 3D ball position; for each on-ground trajectory line, reconstruct a corresponding candidate 3D trajectory by determining, for each on-ground projection point in the on-ground trajectory line, a ball height from a ground plane, and by curve fitting; and reconstruct the 3D ball trajectory by selecting a candidate 3D trajectory with a best trajectory score.

Other aspects of the present invention include devices, servers, and apparatus that perform the aforementioned steps using computer-executable instructions. In particular, other embodiments of the present invention include a device, comprising at least one memory that stores computer-executable instructions; and at least one processor configured to access the at least one memory, wherein the at least one processor of the one or more processors is configured to execute the computer-executable instructions to implement the aforementioned steps.

Yet other aspects of the present invention include methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 8D is a detailed block diagram illustrating an exemplary Initial Prediction Block, according to exemplary embodiments of the present invention;

FIG. 8E is a detailed block diagram illustrating an exemplary Refine Block, according to exemplary embodiments of the present invention;

DETAILED DESCRIPTION OF THE INVENTION

Figure 1A:
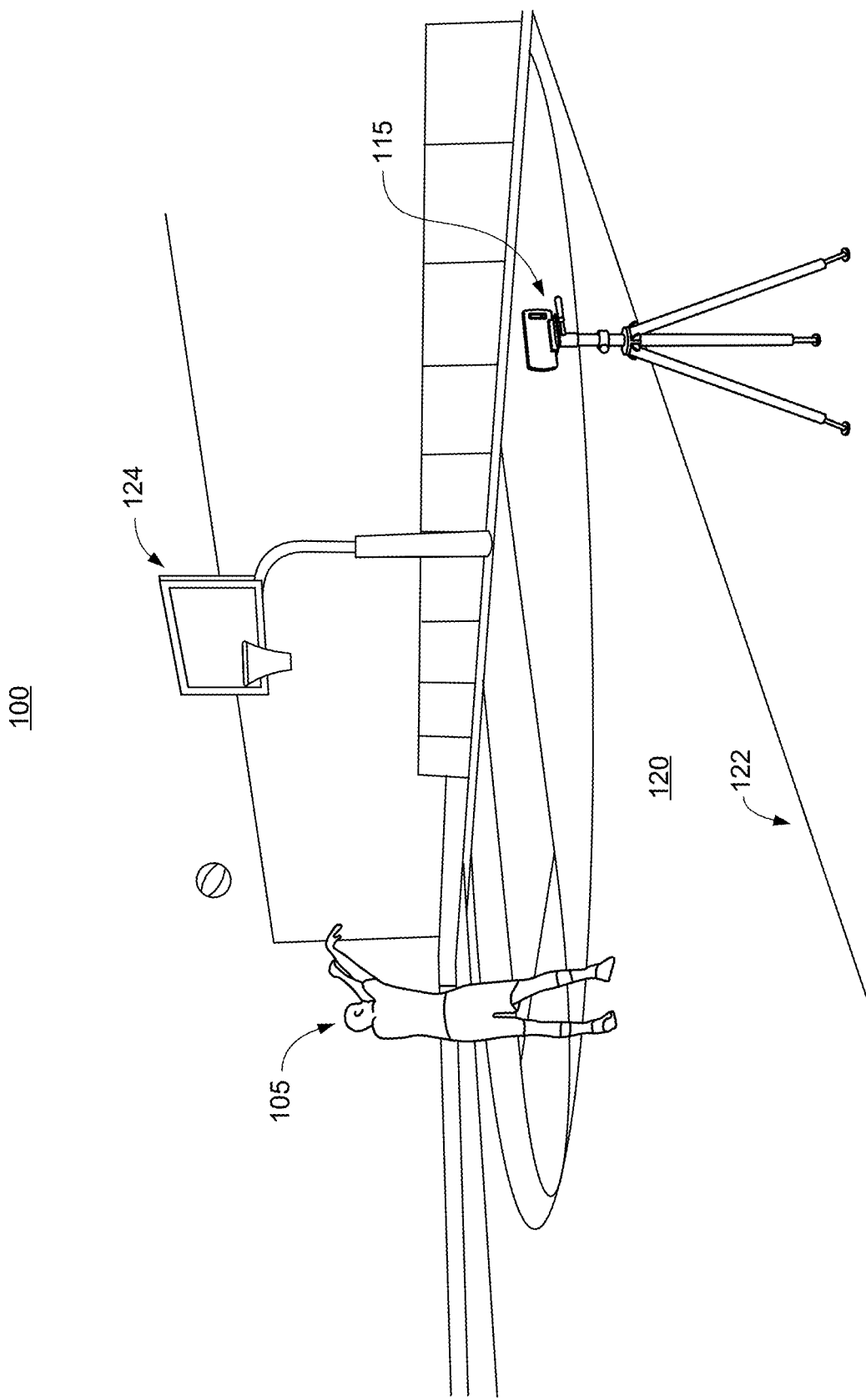
FIG. 1A is an exemplary setup for generating 3D ball trajectories and shot analytics using a mobile computing device, according to some embodiments of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

NEX, NEX TEAM, and HOMECOURT are trademark names carrying embodiments of the present invention, and hence, the aforementioned trademark names may be interchangeably used in the specification and drawing to refer to the products/services offered by embodiments of the present invention. The term NEX, NEX TEAM, or HOMECOURT may be used in this specification to describe the overall game video capturing and analytics generation platform, as well as the company providing said platform. With reference to the figures, embodiments of the present invention are now described in detail.

Introduction and Overview

Broadly, embodiments of the present invention relate to real-time analysis of ball sport games, and pertain particularly to methods and systems for 3D ball trajectory reconstruction on a mobile computing device, from a 2D ball trajectory as extracted by artificial-intelligence (AI)-based computer vision techniques from an input monocular video. A reconstructed 3D ball trajectory may in turn be used for player, shot, and/or game analytics and statistics generation in real-time.

It would be understood by persons of ordinary skill in the art that the terms "game" and "game play" in this disclosure refer to not only competitive activities involving opposing teams, but also individual and group practice or drilling activities. In other words, embodiments of the present invention may be used for capturing and analyzing shot attempts and other aspects of ball sport activities, as long as there is at least one player present in the gaming area being recorded. In some embodiments, such as in a basketball game, the gaming area is marked by court lines bounding a goal post. In addition, while this disclose focuses on basketball games as an illustrative example for implementing and utilizing embodiments of the present invention, it would be clear to one of ordinary skill in the art that embodiments of the present invention may also be applied to soccer, baseball, football, hockey, and many other types of ball sports, where ball and player motion and movements may be analyzed individually or collectively to generate shot analytics and/or game analytics. Furthermore, a "goal" in this disclosure refers to a direction, area, structure, person, or other entity towards or into which players attempt to throw or drive a ball, puck, or a similar object, possibly to score points.

More specifically, embodiments of the present invention relate to generating or reconstructing a 3D ball trajectory from a 2D ball trajectory extracted from a monocular or single-view video captured by a mobile device such as a smartphone, tablet, or laptop. The difficulty in inferencing from 2D image space to 3D physical space lies in the loss of depth information when mapping 3D points onto 2D video frames. A ball trajectory in the 2D image domain may be generated or estimated by performing computer vision techniques to extract individual ball objects, and clustering or grouping such identified objects temporally and spatially. 3D trajectory reconstruction, on the other hand, requires additional depth information, as estimated through additional analysis of the input video. Embodiments of the present invention reconstructs a 3D ball trajectory by analyzing multiple time series of on-ground locations or projections of the ball, deriving in-air 3D locations of the ball via a projection and curve-fitting process, and selecting a best candidate 3D trajectory under a given criteria or having a best score. This 3D trajectory reconstruction process is based on the principle that as a ball flies through air along a parabolic trajectory, its on-ground locations or projections are approximately on a straight line, and approximately evenly distributed on this line when uniformly sampled in the time domain, as provided by individual frames of the input video. By enumerating and comparing different possible on-ground lines, a best 3D trajectory may be obtained. A key feature of the present invention is its simplicity that enables real-time 3D trajectory reconstruction on a mobile computing device.

A 3D ball trajectory thus reconstructed can be used to compute a release angle of the ball from a shooter, an entry angle of the ball into a hoop, or other similar player and shot analytics. The release angle, or the launch angle, is the angle at which a ball is launched from the shooter's hand towards a goal. In basketball games, this is the angle at which the ball is launched towards the basket. Together with player height and distance to the goal, the release angle of the ball affects the entry angle of the ball into the basket and the ball's moving speed at the rim, with both of these two analytics determining the likelihood of the shot being made successfully.

In general, the term analytics refers to meaningful patterns, knowledges, and information from data or statistics. In this disclosure, user or player analytics refer to quantitative and qualitative characterizations of player actions during a gameplay. Exemplary player analytics include but are not limited to, shot types, shot make/miss, shot score, player movement patterns, player moving speed, moving direction, reaction time, jump height and type, jump foot, landing foot, shot release time and angle, and posture statistics such as body bend angle, body rotation, leg bend ratio, and leg power. An analytic may be both a shot analytic specific to a given shot attempt, and a player analytic specific to an identified player. In addition, game analytics generally refer to statistical analytics generated from player analytics and optionally shot analytics over the duration of a game, and team analytics refer to analytics aggregated across players of a team.

Unless otherwise specified, a "video" in this disclosure refers to a monocular or single-view video, which is a sequence of image frames having a single viewing perspective at any given time instant. A binocular or stereo video, on the other hand, is taken using at least two cameras side-byside concurrently to produce two video streams having two slightly different viewing perspectives, with implicit depth information for objects within the captured images. For example, a conventional depth camera deploys two camera lenses spaced slightly apart and calculates depth by estimating disparities between the two images. Recent range imaging camera systems employing time-of-flight techniques measure the amount of time for a dedicated beam of light to be reflected by an object back to a camera sensor, and compute the distance between the object and the camera based on the known speed of light. Depth information on individual objects enables the production of images with blurred layers or sharpened foreground subjects. Traditionally, each frame of a monocular video, such as a mobile phone video clip or a TV broadcast video, is taken with a single camera. In recent years, advancements in digital video processing, computational photography, and hardware design and fabrication have enabled the implementation of multiple cameras having multiple lenses and/or multiple sensors on a single mobile computing device. Seamless switching among multiple cameras, concurrent recording with multiple cameras and instant fusion of optimal image elements, and other computational photography techniques have enabled features such as image stabilization, ultra-wide views, telephoto zoom, night mode, color correction, image smoothing, and the like. In this disclosure, an input video or monocular video is considered to be taken by one or more cameras, each having one or more lenses and/or sensors. In some embodiments, the camera used to capture such a video may have range imaging capabilities for obtaining explicit depth information for every individual pixel of an individual video frame.

Unlike conventional computer vision-based real-time sports analysis systems that require not only multiple high-resolution cameras mounted on top of or by sidelines of a ball field, but also high-end desktop or server hardware, embodiments of the present invention allow users to perform real-time analysis of ball sport games with a single mobile device such as a smartphone, a tablet, a laptop, or smart glasses. In various embodiments, computer vision techniques such as image registration, motion detection, background subtraction, object tracking, 3D trajectory reconstruction, and cluster analysis techniques are selectively combined to perform high accuracy analysis in real-time on a mobile device. The limited computational resources in a mobile device present a very unique challenge. For instance, a smartphone's limited CPU processing power is heat-sensitive. CPU clock rate is reduced by the operating system (OS) whenever the phone heats up. Also, when a system consumes too much memory, it can get killed by the OS. It is also important to be mindful of how much battery the analytics system consumes, otherwise the limited battery on a smartphone may not even last for a desired duration, such as that of a whole game or a training session.

The mobility of and flexibility in mounting a mobile device enables capturing a game video from any angle, and embodiments of the present invention enable the reconstruction of 3D ball trajectories regardless of the angle at which the original game video was captured. Systems deploying embodiments of the present invention can be used in different ball courts or fields, indoor or outdoor settings, under varying lighting conditions. In addition, each step of the 3D trajectory reconstruction process as disclosed herein may be performed in real-time or in an off-line fashion, automatically or upon user request. In some embodiments, one or more of the steps are optional.

NEX System Architecture

FIG. 1A is an exemplary setup 100 for generating 3D ball trajectories and shot analytics using a mobile computing device, according to some embodiments of the present invention. In this illustrative example, a single player 105 shoots towards a goal 124 on a half court 120 bounded by court lines such as 122. A mobile computing device 115 is secured on a mounting apparatus and placed just outside a side court line. This optional mounting apparatus may be a tripod or a kickstand, and mobile computing device 115 may alternatively be placed on the ground or court floor directly, propped against another object such as a water bottle.

During a gameplay or game session, an embodiment of the NEX system implemented on mobile computing device 115 may record a monocular video using one or more on-device cameras, and perform one or more computer vision algorithms on this input game video in real-time, or in near real-time having a small delay on the seconds scale. Such artificial intelligence (AI)-based analysis enables the determination of player locations, ball trajectories, and optionally shot attempts, shot attempt results, shot locations, and shooter identities and forms, which in turn enable the generation of game analytics and game video annotations. Mobile computing device 115 may comprise one or more cameras each having one or more lenses and/or one or more sensors for capturing a monocular game video. The captured game video may be presented through a display screen on mobile computing device 115, with or without superimposed graphical or textual instructions, player annotations, ball trajectories, analytics, statistics, or other game information add-ons. In some embodiments, mobile computing device 115 may be coupled to a larger external display, through a wireless or wired connection, such that player 105 or other users of the NEX system may see the captured video, annotations, and generated analytics with better clarity.

Figure 1B:
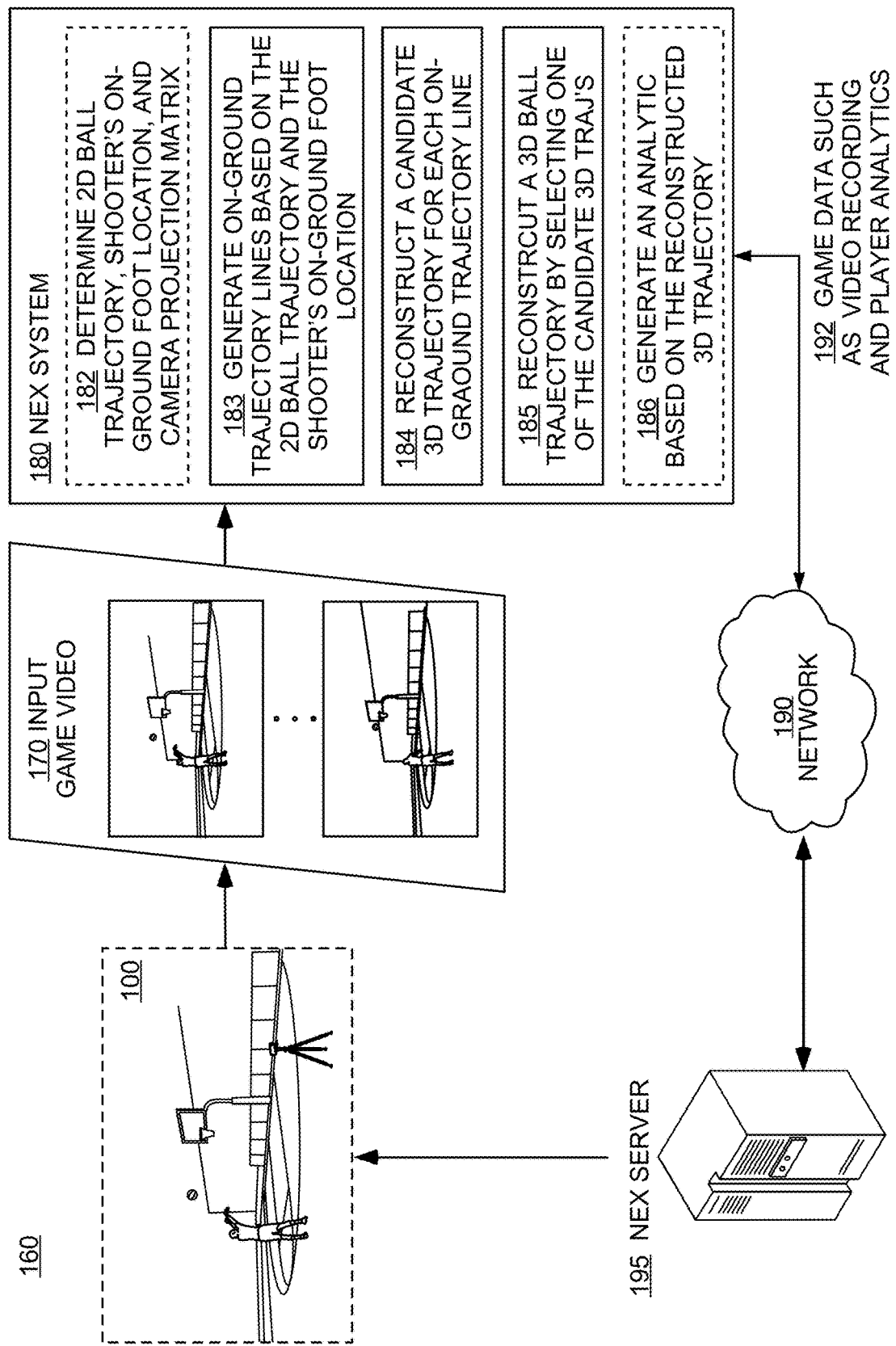
FIG. 1B is an architectural overview of a mobile computing device-based system for 3D ball trajectory reconstruction and shot analytics generation, according to some embodiments of the present invention.

FIG. 1B is an architectural overview 160 of a mobile computing device-based system for 3D ball trajectory reconstruction and shot analytics generation, according to some embodiments of the present invention. A NEX system 180 shown in FIG. 1B may be implemented on mobile device such as 115 to capture player actions and ball motions in a gaming area such as a ball court. An input game video 170 thus captured by mobile computing device 115 is analyzed by NEX system 180 using one or more computer vision algorithms, which may also be implemented on mobile computing device 115. Player motion, movements, or postures, 2D and 3D ball trajectories, as well as basket and court line positions may be determined. In some embodiments, input game video 170 may by a live video stream captured in real-time.

In various embodiments of the present invention, exemplary mobile computing devices include, but are not limited to, dedicated or general-purpose hardware, smartphones, tablets, laptops, smart watches, and the like. In some embodiments, a first mobile computing device is used for image capturing, such as with a point-and-shoot camera or a high-end single-lens reflex camera, while NEX system 180 is implemented separately in a connected hardware system. In other words, NEX system 180 may be implemented directly on a mobile computing device 115, or may be implemented in software or hardware connected to or coupled with mobile computing device 115. In some embodiments, NEX system 180 is a distributed system, where detection and tracking, 3D ball trajectory reconstruction, and analytics generation services 182 to 186 are implemented on physically or logically separate devices. In some embodiments, one or more portions of NEX system 180 may be hosted in the cloud. In yet some other embodiments, more than one instances of NEX system 180 may be networked, via a network 190 and a NEX server 195, with game data 192 such as video recording and player analytics shared among the different instances of NEX system 180. Additionally, NEX system 180 may retrieve game recordings or input videos 170 from local memory or from a remote database. Generally, "receive", "receipt," "retrieve," "retrieval," or "access" to or of a video recording refers to the actions of performing read and/or write operations to video content saved in memory, with or without explicit graphical displays on a display device such as a touch screen.

More specifically, as it is being captured and streamed by NEX system 180, input game video 170 may first be analyzed at an optional step 182, after mobile computing device 115 or input game video 170 has been calibrated or adjusted for device levelness, distance from the player, brightness under a current lighting condition, and other similar environmental parameters. Although not shown explicitly, NEX system 180 may first identify a goal post, a goal comprising a backboard and a hoop, and/or court lines as defining a gaming area of interest. A camera projection matrix may also be generated through a court rectification process, based on detected court key points or backboard key points. Court rectification refers to the process of determining camera pose and projection of the court, in terms of a linear transform having a projection matrix. The court area may be defined using a set of cartesian coordinates centered at a selected point, for example at one corner or the court, with an x-axis parallel to the end line, a z-axis parallel to the sidelines, and a y-axis perpendicular to the ground plane. One exemplary implementation for court rectification and backboard detection is provided by related and issued U.S. Pat. No. 10,489,656, entitled "Methods and Systems for Ball Game Analytics with a Mobile Device," the entire disclosure of which is hereby incorporated by reference in its entirety herein.

In addition to analyzing the captured scene to determine and define the court area, during step 182, NEX system 180 may analyze newly received frames to track player and ball motions within the court area. For example, NEX system 180 may apply pose-estimation to detect player poses and ball positions in each frame of the input video. In computer vision, pose or posture estimation is the task of identifying or detecting the position and orientation of an object in an image, relative to some coordinate system. This is generally formulated as the process of determining key point locations that describe the object. In the case of a ball, pose estimation may refer to determining the center and radius of the ball in the image plane. Human pose estimation is the process of detecting major part and joints of the body, such as head, torso, shoulder, ankle, knee, and wrist. In this disclosure, "player posture" and "player pose" are used interchangeably to refer to either or both of the image of a human player segmented from the input video, and a set of key points extracted from the image to represent body pose or posture. In addition, instead of only determining whether an object such as a ball or a player is present in a given video frame, object detection or extraction in the present disclosure refers to determining the relative position, size, and/or pose of a ball, player, or other entities of interest. In some embodiments, the object detection process is applied on a skip frame basis, for example at regular intervals to down-sample the input video stream before processing to reduce computation load, or to possibly bypass desired portions of the input video stream such as when the players are known to be dribbling instead of making shot attempts.

To detect objects of interests such as court lines, balls and players from frames of the input video, one or more convolutional neural networks (CNN) may be applied. Each CNN module may be trained using one or more prior input videos. A CNN utilizes the process of convolution to capture the spatial and temporal dependencies in an image, and to extract features from the input video for object detection. The term "feature" here is not limited to visual or color schemes of objects to be detected, it also covers many other object characteristics, including shapes, sizes, curvatures, textures, boundaries, and the like. Feature extraction in turn enables segmentation or identification of image areas representing these objects such as balls and players, and further analysis to determine player body postures. A ball moves through space, leading to changing size and location from video frame to video frame. A player also moves through space while handling the ball, leading to both changing locations, sizes, and body postures.

Once objects are detected or extracted from individual frames, they may be classified into respective clusters, each representing the same object, and object flows may be established subsequently or concurrently by grouping detected objects within the same cluster along a time line. Object movements across frames are continuous in the sense that object locations can only change in small increments from one video frame to the next. In some embodiments, a flow refers to object instances from different frames. All object instances in the same flow may be considered the same object. In other words, for a ball or posture in a flow, all instances of the ball or posture in all frames of the video are identified as the same object. A detected ball flow during an in-air flight is a parabolic trajectory in the 2D image plane, tracing projectile motion in 3D space.

For each player posture extracted, a corresponding player foot location within the 2D image plane of the input video frame may be determined by examining the coordinates of key points representing the player's ankles or feet and its projection on the ground plane. Such a location may in turn be converted, based on court rectification information, into a set of 2D coordinates on the ground plane of the ball court. The player's foot location at the time when a ball is shot from his/her hands towards the goal is called a "shooting location" or the shooter's "on-ground foot location" associated with a shot attempt.

Once the ball leaves the shooter's hands, it is in projectile motion along a parabolic trajectory under the influence of gravity only, assuming air resistance is negligible. That is, the ball experiences a downward acceleration only, with the horizontal component of its velocity staying constant under inertia. On any plane parallel to the ground, the projection of the ball moves approximately on a straight line at a constant speed. Based on this characteristic of the ball's movement during a shot attempt, step 183 generates multiple "on-ground trajectory lines" each enumerating an assumption on the ball's movement. An on-ground trajectory line refers to a projection of a ball's 3D trajectory onto the ground level, and is a set of sampled projection points that when connected on the ground or in the 2D image plane, forms a line from the shooter's foot location towards the general direction of the goal. As consecutive frames of the video are taken at uniform intervals, projections points within the on-ground trajectory line may be spaced approximately equally apart, or proportionally to frame sampling intervals.

At step 184, a candidate 3D trajectory corresponding to each on-ground trajectory line may be reconstructed, by first computing an in-air height of the ball from the ground plane, for each sample point within the on-ground trajectory line, then curve fitting these estimated 3D points to a parabolic curve. Subsequently at step 185, the desired 3D trajectory reconstruction is performed by selecting one of the candidate 3D trajectories, based on a given measure, such as back projection error, or gravity estimation error. For example, 3D positions of the ball as sampled from the fitted curves may be projected back onto the image plane using the camera projection matrix previously computed, and compared numerically to the actual positions of the ball within the image plane. The reconstructed 3D ball trajectory can be used in an optional step 186 to generate one or more analytics such as release angle and speed, entry angle into the hoop, and shot attempt result.

Before illustrating the disclosed 3D ball trajectory reconstruction process with more details, the next subsection provides a set of exemplary implementations of components and process steps shown in FIGS. 1A and 1B.

Implementation using Computer Program Products, Methods, and Computing Entities

Exemplary System Architecture

Figure 2:
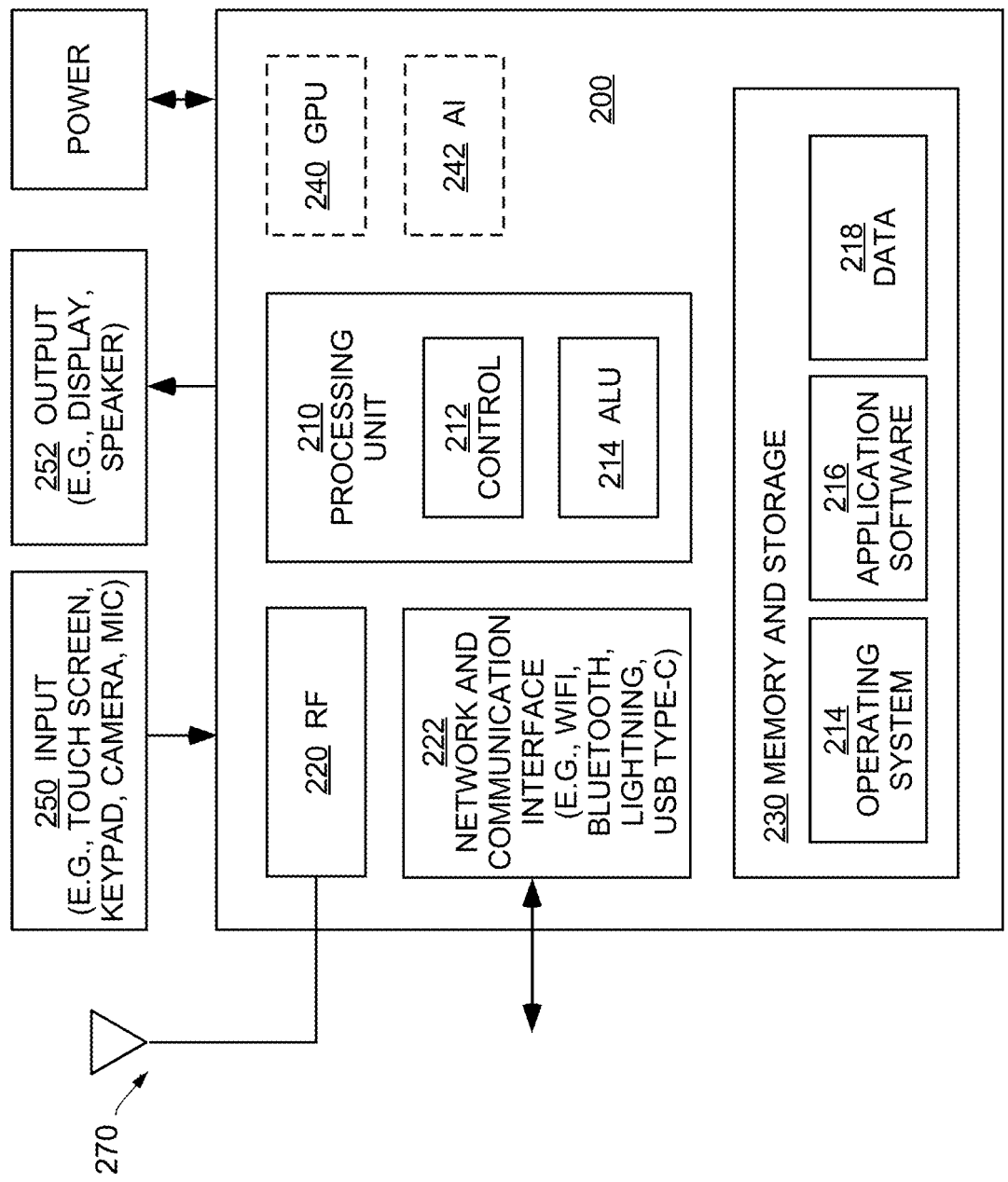
FIG. 2 is an exemplary schematic diagram of a user computing entity for implementing a ball game tracking and analytics generation system, according to exemplary embodiments of the present invention.
Figure 3:
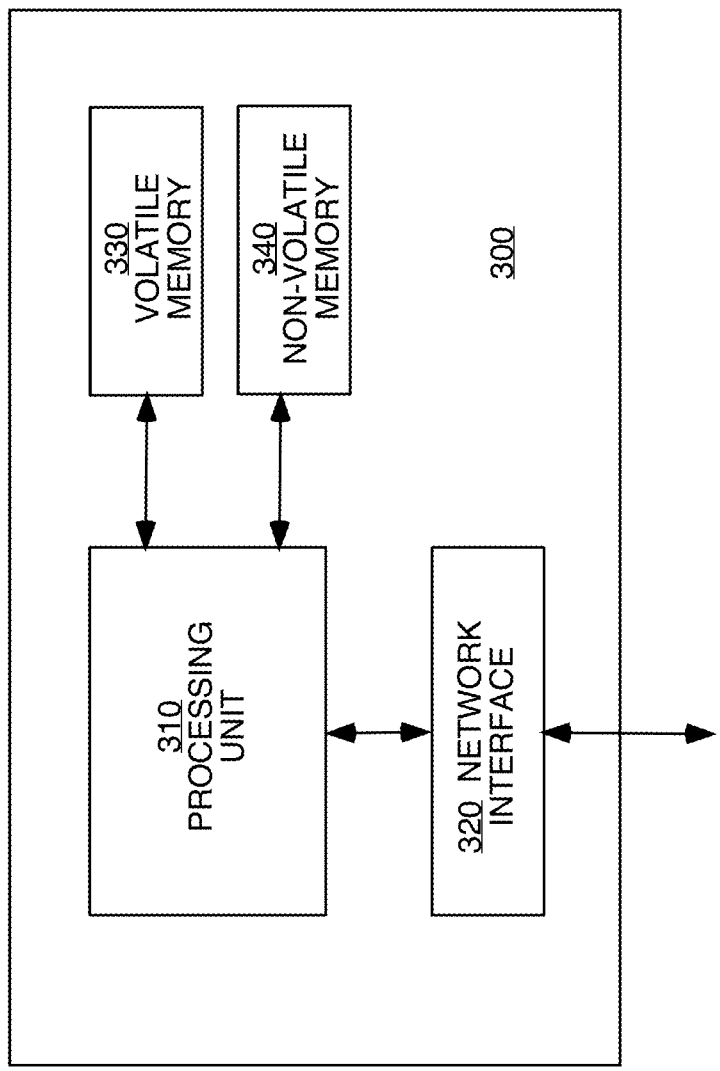
FIG. 3 is an exemplary schematic diagram of a management computing entity for implementing a ball game tracking and analytics generation system, according to exemplary embodiments of the present invention.

An exemplary embodiment of the present disclosure may include one or more user computing entities 200, one or more networks, and one or more server or management computing entities 300, as shown in FIGS. 2 and 3. Each of these components, entities, devices, systems, and similar words used herein interchangeably may be in direct or indirect communication with, for example, one another over the same or different wired or wireless networks. Additionally, while FIGS. 2 and 3 illustrate the various system entities as separate, standalone entities, the various embodiments are not limited to this particular architecture.

Exemplary User Computing Entity

FIG. 2 is an exemplary schematic diagram of a user computing device for implementing a ball game tracking and analytics generation system, including a 3D ball trajectory reconstruction module, according to exemplary embodiments of the present invention. A user operates a user computing device 200 that includes one or more components as shown. As will be recognized, these architectures and descriptions are provided for exemplary purposes only and are not limiting to the various embodiments.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, generating for display, monitoring, evaluating, comparing, and/or similar terms used herein interchangeably. In various embodiments, these functions, operations, and/or processes can be performed on data, content, information, and/or similar terms used herein interchangeably. Furthermore, in embodiments of the present invention, user computing device 200 may be a mobile device, and may be operated by a user playing alone or participating in a multiplayer ball game. On the other hand, a server 195 may be implemented according to the exemplary schematic diagram shown in FIG. 3, possibly in the cloud, and possibly with logically or physically distributed architectures.

As shown in FIG. 2, the user computing entity 200 may include an antenna 270, a radio transceiver 220, and a processing unit 210 that provides signals to and receives signals from the transceiver. The signals provided to and received from the transceiver may include signaling information in accordance with air interface standards of applicable wireless systems. In this regard, the user computing entity 200 may be capable of operating with one or more air interface standards, communication protocols, modulation types, and access types. More particularly, the user computing entity 200 may operate in accordance with any of a number of wireless communication standards and protocols. In some embodiments, user computing entity 200 may operate in accordance with multiple wireless communication standards and protocols, such as 5G, UMTS, FDM, OFDM, TDM, TDMA, E-TDMA, GPRS, extended GPRS, CDMA, CDMA2000, 1×RTT, WCDMA, TD-SCDMA, GSM, LTE, LTE advanced, EDGE, E-UTRAN, EVDO, HSPA, HSDPA, MDM, DMT, Wi-Fi, Wi-Fi Direct, WiMAX, UWB, IR, NFC, ZigBee, Wibree, Bluetooth, and/or the like. Similarly, the user computing entity 200 may operate in accordance with multiple wired communication standards and protocols, via a network and communication interface 222.

Via these communication standards and protocols, the user computing entity 200 can communicate with various other computing entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). User computing entity 200 can also download changes, add-ons, and updates, for instance, to its firmware, software (e.g., including executable instructions, applications, program modules), and operating system.

In some implementations, processing unit 210 may be embodied in several different ways. For example, processing unit 210 may be embodied as one or more complex programmable logic devices (CPLDs), microprocessors, multi-core processors, coprocessing entities, application-specific instruction-set processors (ASIPs), microcontrollers, and/or controllers. Further, the processing unit may be embodied as one or more other processing devices or circuitry. The term circuitry may refer to an entirely hardware embodiment or a combination of hardware and computer program products. Thus, processing unit 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 210 may be configured for a particular use or configured to execute instructions stored in volatile or non-volatile media or otherwise accessible to the processing unit. As such, whether configured by hardware or computer program products, or by a combination thereof, processing unit 210 may be capable of performing steps or operations according to embodiments of the present invention when configured accordingly.

In some embodiments, processing unit 210 may comprise a control unit 212 and a dedicated arithmetic logic unit 214 (ALU) to perform arithmetic and logic operations. In some embodiments, user computing entity 200 may optionally comprise a graphics processing unit 240 (GPU) for specialized image and video rendering tasks, and/or an artificial intelligence (AI) accelerator 242, specialized for applications including artificial neural networks, machine vision, and machine learning. In some embodiments, processing unit 210 may be coupled with GPU 240 and/or AI accelerator 242 to distribute and coordinate processing tasks.

In some embodiments, user computing entity 200 may include a user interface, comprising an input interface 250 and an output interface 252, each coupled to processing unit 210. User input interface 250 may comprise any of a number of devices or interfaces allowing the user computing entity 200 to receive data, such as a keypad (hard or soft), a touch display, a mic for voice/speech, and a camera for motion or posture interfaces. User output interface 252 may comprise any of a number of devices or interfaces allowing user computing entity 200 to provide information to a user, such as through the touch display, or a speaker for audio outputs. In some embodiments, output interface 252 may connect user computing entity 200 to an external loudspeaker or projector, for audio or visual output.

User computing entity 200 may also include volatile and/or non-volatile storage or memory 230, which can be embedded and/or may be removable. A non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store an operating system 214, application software 216, data 218, databases, database instances, database management systems, programs, program modules, scripts, source code, object code, byte code, compiled code, interpreted code, machine code, executable instructions, and/or the like to implement the functions of user computing entity 200. As indicated, this may include a user application that is resident on the entity or accessible through a browser or other user interface for communicating with a management computing entity and/or various other computing entities.

In some embodiments, user computing entity 200 may include location determining aspects, devices, modules, functionalities, and/or similar words used herein interchangeably. For example, user computing entity 200 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites. Alternatively, the location information may be determined by triangulating the user computing entity's position in connection with a variety of other systems, including cellular towers, Wi-Fi access points, and/or the like. Similarly, user computing entity 200 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

In a ball game tracking and analytics generation session, a user computing entity 200 may be deployed (e.g., installed; configured; accepted; installed and accepted; configured and accepted; installed, configured, and accepted; or the like) in a gaming area that includes players and/or game equipment. In some embodiments, at least one input device on user computing entity 200 may collect or may be configured to collect information (e.g., data, metadata, and/or signaling) indicative of operational features of the gaming area and/or equipment for analysis by processing unit 210. For example, computer vision algorithms as implemented on user computer entity 200 may be configured to detect the location of court lines, field boundaries, one or more balls, or goal posts in an input video as captured by an input camera device.

In some embodiments, a system for ball game tracking and analytics generation may include at least one user computing device such as a mobile computing device and optionally a mounting apparatus for the at least one mobile computing device. The mounting apparatus may be a tripod or a kickstand, and may mount the electronic device with a camera of the user computing device positioned to monitor a gaming area. In some embodiments, the user computing device may be hand-held or put on the ground leaning against certain articles such as a water bottle. In some embodiments, the system for ball game tracking and analytics generation further comprises a sound device, for example, earbuds (e.g., wireless earbuds) or a speaker system (e.g., a public address (PA) system) coupled to the at least one user computing device. The sound device may serve to provide instruction and feedback regarding the game session to the user. In some embodiments, the system optionally comprises an optical device such as a projector, a projection lamp, a laser pointing system, a jumbotron, a television screen, or the like, that can facilitate a ball game tracking and analytics generation session. For example, a laser pointing system may point to a location in the gaming area to direct the user to position himself or herself for easier system calibration, initialization, and setup.

In some embodiments, user computing entity 200 may communicate to external devices like other smartphones and/or access points to receive information such as software or firmware, or to send information (e.g., training data such as analytics, statistics, scores, recorded video, etc.) from the memory of the user computing device to external systems or devices such as servers, computers, smartphones, and the like.

In some embodiments, two or more users may establish a connection between their computing devices using a network utilizing any of the networking protocols listed previously. Some users may be in geographically different gaming areas. In some embodiments, the user computing devices may use a network interface such as 222 to communicate with various other computing entities, such as by communicating data, content, information, and/or similar terms used herein interchangeably that can be transmitted, received, operated on, processed, displayed, stored, and/or the like.

In some embodiments, data such as training statistics, scores, and videos may be uploaded by one or more user computing devices to a server such as shown in FIG. 3 when the device accesses a network connection, such as a wireless access point or hotspot. The data transfer may be performed using protocols like file transfer protocol (FTP), MQ telemetry transport (MQTT), advanced message queuing protocol (AMQP), hypertext transfer protocol (HTTP), and HTTP secure (HTTPS). These protocols may be made secure over transport layer security (TLS) and/or secure sockets layer (SSL).

In some embodiments, audio generated by a user computing device and/or audio generated by one or more users may be used to facilitate a ball game tracking and analytics generation session. In some embodiments, audio may be used to (i) direct users to particular positions in gaming areas (with further audio feedback to help the users locate themselves more accurately), (ii) inform users about a motion or action that a user needs to do as part of a setup process or as part of a game (e.g., stand at the center of the free-throw line or shoot from the three-point line), (iii) provide feedback to the user (e.g., to inform them of a shot analytics such as a shot angle), or (iv) report on the progress of the game (e.g., statistics, leaderboard, and the like). In some embodiments, speech recognition and corresponding responses (e.g., audio, visual, textual, etc. responses) may also be used to facilitate the game tracking session by allowing users to set options, or start or stop the tracking session.

In some embodiments, artificial intelligence-based computer vision algorithms may be used to perform at least one of the following: (i) ensure that users are located within a region of interest, (ii) determine when/if users successfully complete a shot attempt, (iii) determine the quality of users' motion/action during the shot attempt, and (iv) award quality points or other attributes depending on the nature of the users' motion during the shot attempt (e.g., determining whether a user scored by dunking or by performing a layup).

To provide for or aid in the numerous determinations (e.g., determine, ascertain, infer, calculate, predict, prognose, estimate, derive, forecast, detect, compute) of player motions, ball movements, and analytics described herein, components described herein may examine the entirety or a subset of data to which it is granted access and can provide for reasoning about or determine states of the system or environment from a set of observations as captured via events and/or data. Determinations may be employed to identify a specific context or action, or may generate a probability distribution over states, for example. The determinations may be probabilistic. That is, the computation of a probability distribution over states of interest based on a consideration of data and events. Determinations may also refer to techniques employed for composing higher-level events from a set of events and/or data.

Such determinations may result in the construction of new events or actions from a set of observed events and/or stored event data, whether the events are correlated in close temporal proximity, and whether the events and data come from one or several event and data sources. For example, instructions and feedbacks to player may be generated from one or more player analytics derived from user actions. Further, components disclosed herein may employ various classification schemes (e.g., explicitly trained via training data or implicitly trained via observing behavior, preferences, historical information, receiving extrinsic information, etc.) and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems may be used to automatically learn and perform a number of functions, actions, and/or determinations.

Exemplary Management Computing Entity

FIG. 3 is an exemplary schematic diagram of a management computing entity 300, such as NEX server 195, for implementing a ball game tracking and analytics generation system, according to exemplary embodiments of the present invention. The terms computing entity, computer, entity, device, system, and/or similar words used herein interchangeably are explained in detailed with reference to user computing entity 200.

As indicated, in one embodiment, management computing entity 300 may include one or more network or communications interface 320 for communicating with various computing entities, such as by communicating data, content, information, and/or similar terms used herein interchangeably that can be transmitted, received, operated on, processed, displayed, stored, and/or the like. For instance, management computing entity 300 may communicate with user computing device 200 and/or a variety of other computing entities. Network or communications interface 320 may utilized a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 300 may be configured to communicate via wireless external communication networks using any of a variety of standards and protocols as discussed with reference to user computing device 200.

As shown in FIG. 3, in one embodiment, management computing entity 300 may include or be in communication with one or more processing unit 310 (also referred to as processors, processing circuitry, processing element, and/or similar terms used herein interchangeably) that communicate with other elements within the management computing entity 300. As will be understood, processing unit 310 may be embodied in a number of different ways. For example, as one or more CPLDs, microprocessors, multi-core processors, coprocessing entities, ASIPs, microcontrollers, and/or controllers, in the form of integrated circuits, application specific integrated circuits (ASICs), field programmable gate arrays (FPGAs), programmable logic arrays (PLAs), hardware accelerators, other circuitry, and/or the like. As will therefore be understood, processing unit 310 may be configured for a particular use or configured to execute instructions stored in volatile or non-volatile media 330 and 340. As such, whether configured by hardware or computer program products, or by a combination thereof, processing unit 310 may be capable of performing steps or operations according to embodiments of the present disclosure when configured accordingly.

Although not shown explicitly, management computing entity 300 may include or be in communication with one or more input elements, such as a keyboard, a mouse, a touch screen/display, a camera for motion and movement input, a mic for audio input, a joystick, and/or the like. Management computing entity 300 may also include or be in communication with one or more output elements such as speaker, screen/display, and/or the like.

In various embodiments, one or more of the components of management computing entity 300 may be located remotely from other management computing entity components, such as in a distributed system or in the cloud. Furthermore, one or more of the components may be combined and additional components performing functions described herein may be included in the management computing entity 300.

Machine Vision and Machine Learning Modules

As described herein, embodiments of the present invention use one or more artificial intelligence, machine vision, and machine learning algorithms or modules for analyzing game videos and facilitating real-time game tracking and 3D ball trajectory reconstruction. Various exemplary machine vision algorithms are within the scope of the present invention used for performing object recognition, gesture recognition, pose estimation, and so forth. The following description describes in detail some illustrative machine vision and machine learning algorithms for implementing some embodiments of the present invention.

Illustrative Machine Vision Architectures

Some exemplary machine vision algorithms utilize a deep learning network (DLN), for example a convolutional neural network (CNN). Neural networks are computer systems inspired by the human brain. They can be viewed as parallel, densely interconnected computational models that adaptively learn through automatic adjustment of system parameters based on training data. Input information are modified based on system parameters when traversing through layers of interconnected neurons or nodes, to activate or trigger particular outputs. The design of a neural network refers to the configuration of its architecture or topology, or the specific arrangements of layers and nodes in the network. The applicability, utility, and optimality of a neural network, and the framework in which the neural network is deployed are often mutually interdependent. Convolutional Neural Networks utilize the process of convolution to reduce the number of model parameters involved, while successfully capturing the spatial and temporal dependencies in an image.

Figure 4:
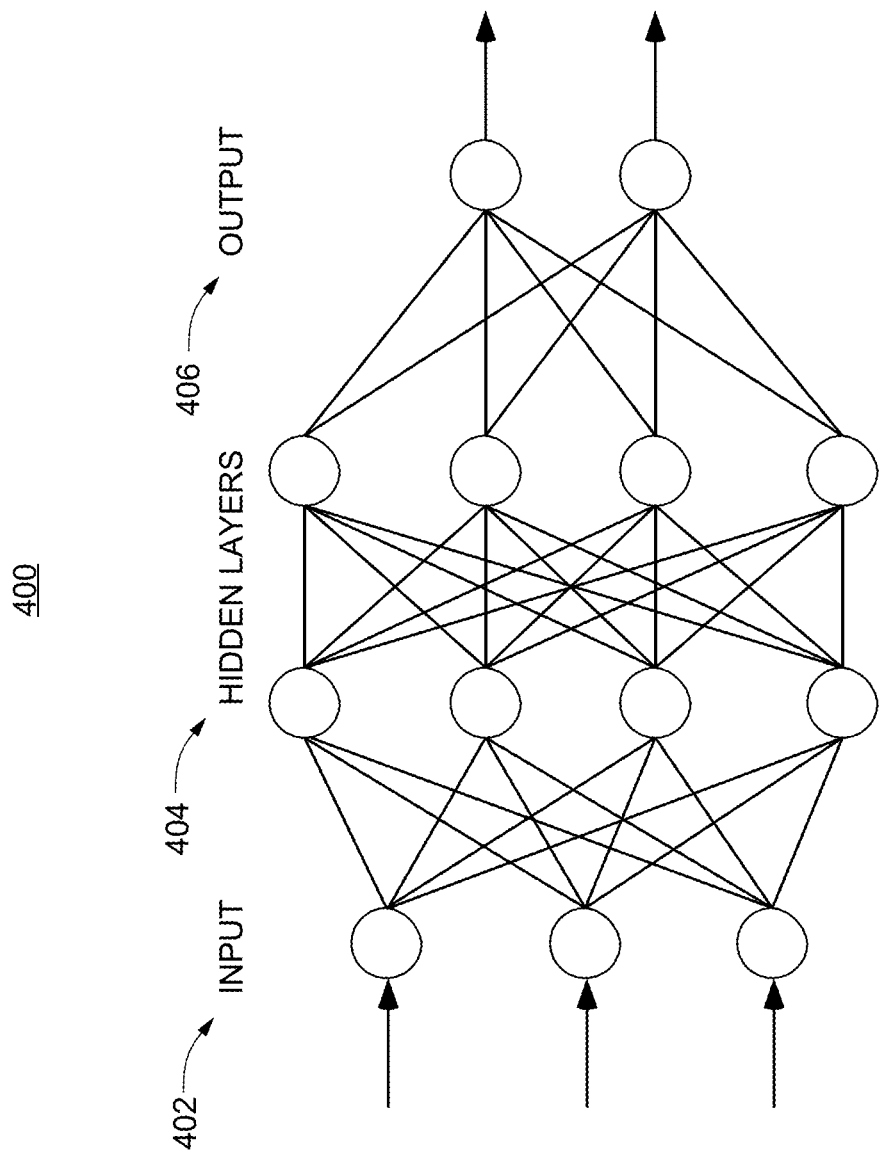
FIG. 4 shows an illustrative block diagram of a convolutional neural network (CNN) for image analysis, according to exemplary embodiments of the present invention.

More specifically, FIG. 4 shows an illustrative block diagram 400 of a convolutional neural network (CNN) for image analysis and object recognition, according to exemplary embodiments of the present invention. This exemplary CNN module 400 may be utilized for implementing various machine vision algorithms described herein. For example, it may be designed and trained to determine gestures and poses and other machine vision tasks required by the present invention, as would be recognized by one of ordinary skill in the art. An input layer 402 is connected via a multiplicity of hidden layers 404 to an output layer 406. Input layer 402 is a map for pixels of an input image. Exemplary hidden layers may include, but are not limited to, convolutional layers, Rectified Linear Units (ReLU), pooling layers, normalization layers, and fully connected layers. A convolutional layer applies a convolution or correlation operation by a kernel matrix to the input data to generate a feature map of the input image. ReLU is a non-linear activation function. Pooling layers reduce the dimensionality of the data to decrease the required computational power. A fully connected layer has full connections to all activations in the previous layer, and is needed before classification or output activation at output layer 406. Successive convolution-ReLU-pooling stages allow the successive extraction of low-level to high-level features, from edges, general shapes such as line and circles, to specific shapes representing specific objects. FIG. 8A to 8E provide exemplary block diagrams of a detailed neural network design for pose estimation.

FIG. 4 shows only one illustrative CNN architecture that is within the scope of the present invention, but the present invention is not limited to the use of CNNs. Other machine vision algorithms are also within the scope of the present invention.

Illustrative Machine Learning Architectures

Figure 5:
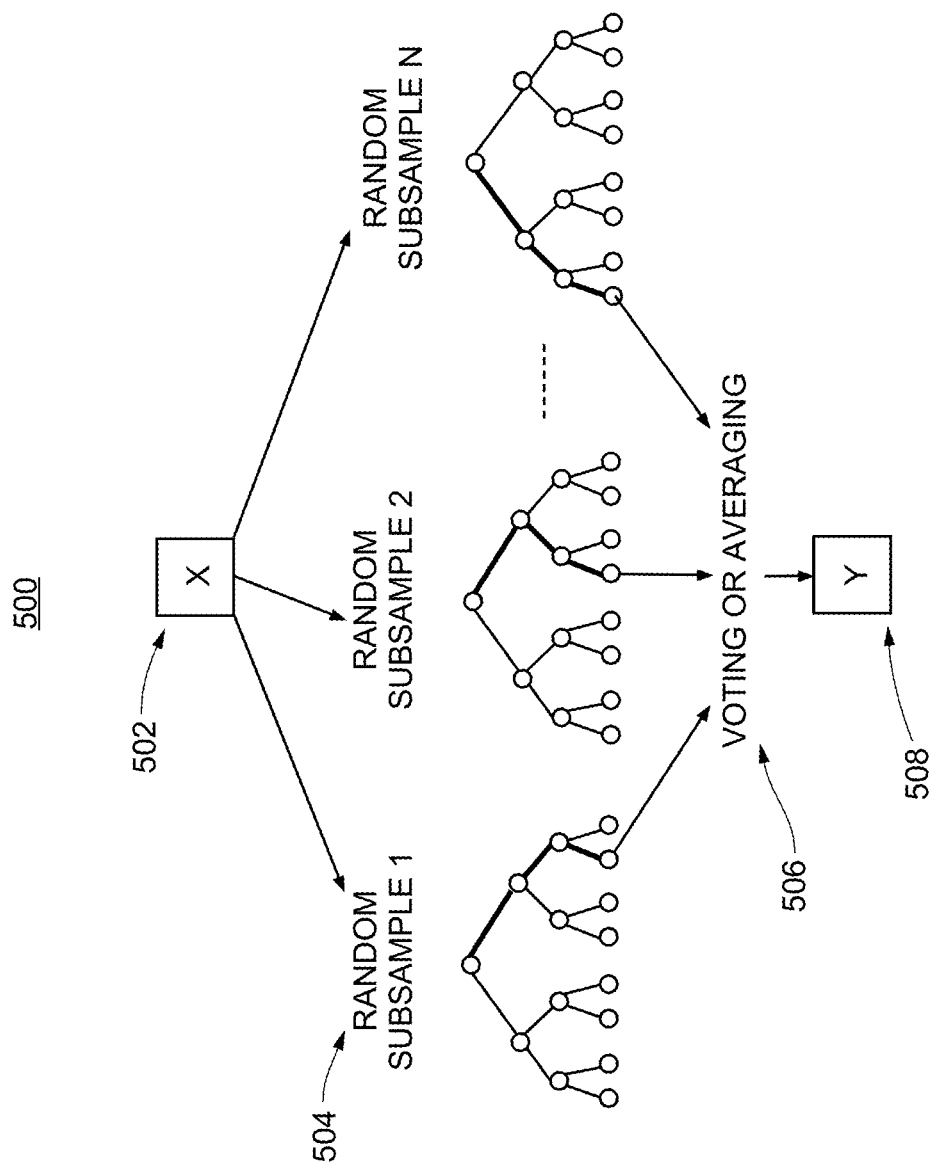
FIG. 5 shows an illustrative block diagram for a machine learning algorithm, according to exemplary embodiments of the present invention.

As states herein, various exemplary machine vision and machine learning algorithms are within the scope of the present invention for performing object recognition, gesture recognition, pose estimation, and so forth. FIG. 5 shows an illustrative block diagram 500 for a machine learning algorithm, according to exemplary embodiments of the present invention.

In particular, a supervised machine learning algorithm is shown, comprising an illustrative random forest algorithm. Random forest algorithms are a method for classification and regression. By using a multitude of decision tree predictors 504, each depending on the values of a random subset of a training data set 502, the chances of overfitting to the training data set may be minimized. The decision tree predictors are voted or averaged at a decision step 506 to obtain predictions 508 of the random forest algorithm. For the task of object recognition, input 502 to the machine learning algorithm may include feature values, while output 508 may include predicted gestures and/or poses associated with a user. Random forest is only one illustrative machine learning algorithm that is within the scope of the present invention, and the present invention is not limited to the use of random forest. Other machine learning algorithms, including but not limited to, nearest neighbor, decision trees, support vector machines (SVM), Adaboost, Bayesian networks, various neural networks including deep learning networks, evolutionary algorithms, and so forth, are within the scope of the present invention.

In short, embodiments of devices, systems, and their various components described herein may employ artificial intelligence (AI) to facilitate automating one or more functions described herein, including object recognition, gesture recognition, and pose estimation.

Training Machine Learning Algorithms

Figure 6:
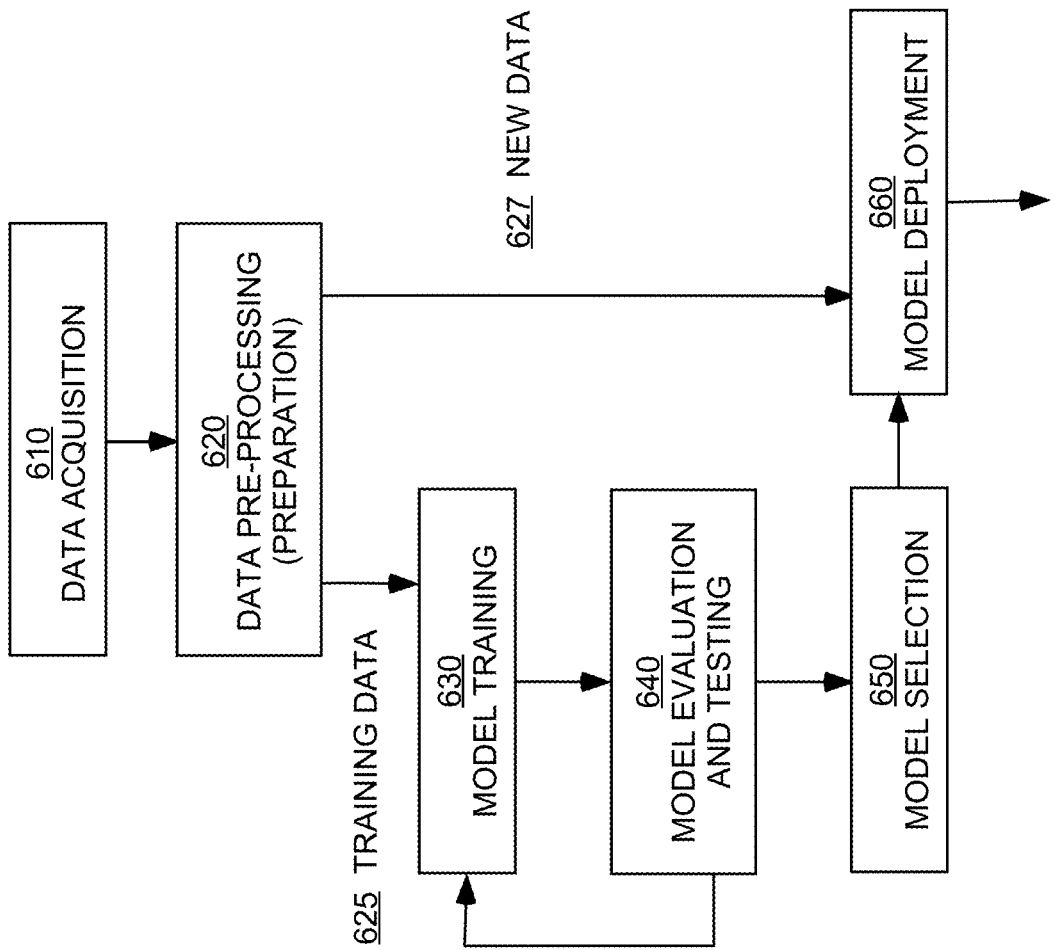
FIG. 6 shows an illustrative flow diagram for training a machine learning algorithm, according to exemplary embodiments of the present invention.

FIG. 6 shows an exemplary flow diagram 600 for training a machine learning (ML) algorithm, which may be utilized in object recognition, pose estimation, and object flow construction, according to exemplary embodiments of the present invention;

The training process begins at step 610 with data acquisition. At step 620, acquired data are pre-processed, or prepared. At step 630, a machine learning model is trained using training data 625. At step 640, the model is evaluated and tested, and further refinements to the model are fed back into step 630. At step 650, optimal model parameters are selected, for deployment at step 660. New data 627 may be used by the deployed model to make predictions.

A starting point for any machine learning method such as used by the machine learning component above is a documented dataset containing multiple instances of system inputs and correct outcomes (e.g., training data 625). This data set may be used, using methods known in the art, including but not limited to standardized machine learning methods such as parametric classification methods, non-parametric methods, decision tree learning, neural networks, methods combining both inductive and analytic learning, and modeling approaches such as regression models, to train the machine learning system and to evaluate and optimize the performance of the trained system. Thus, it would be understood by people of ordinary skill in the art that "training data" 625 as referred to in this subsection are directed to data for training a machine vision algorithm or a machine learning algorithm.

The quality of the output of the machine learning system output depends on (a) pattern parameterization, (b) learning machine design, and (c) quality of the training database. These components may be refined and optimized using various methods. For example, the database may be refined by adding datasets for new documented gestures and poses. The quality of the database may be improved, for example, by populating the database with cases in which the gestures and/or poses were correctly recognized. In one embodiment, the database includes data, for example, of mistaken identification of gestures and/or poses, which may assist in the evaluation of a trained system.

Figure 7:
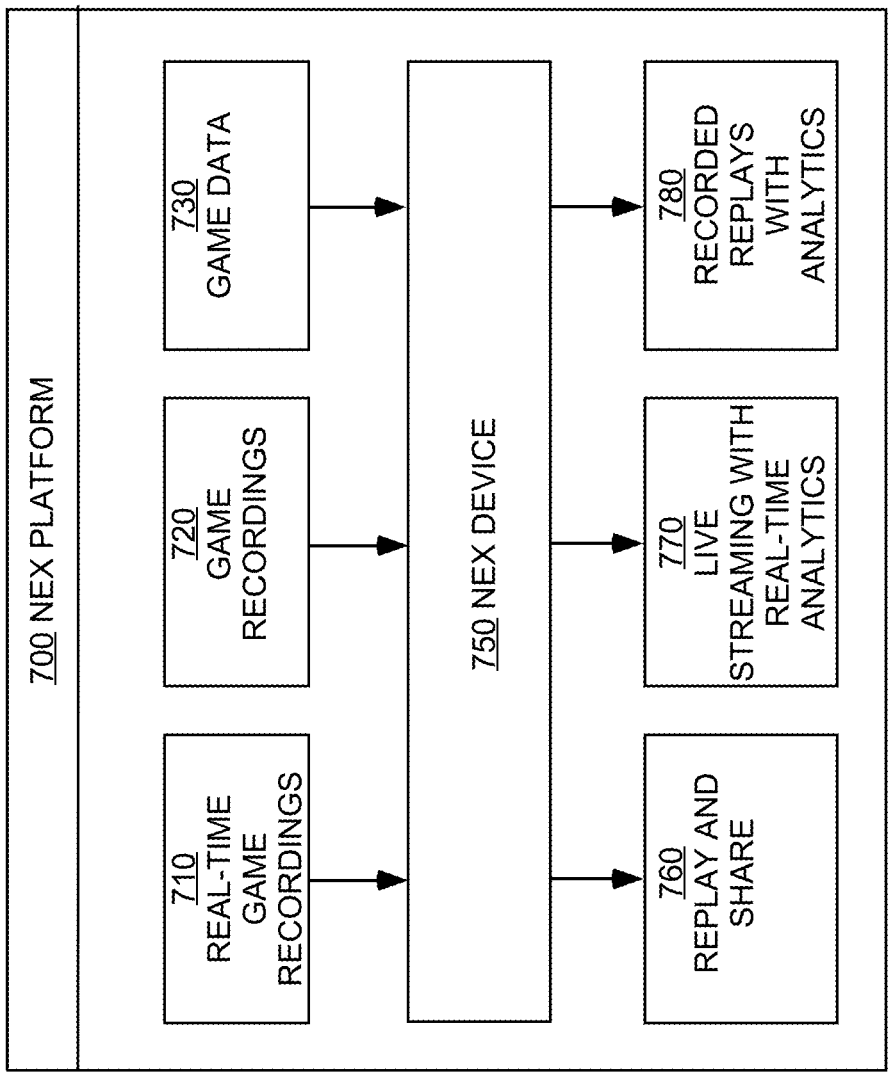
FIG. 7 is a schematic diagram illustrating an exemplary NEX platform, according to exemplary embodiments of the present invention.

FIG. 7 is a schematic diagram illustrating and summarizing some functionalities provided by an extended NEX platform 700, according to some exemplary embodiment of the present invention. In particular, a NEX device 750 may take in real-time streaming game recordings 710, on-demand streaming game recordings 720, game data 730, and facilitate game tracking to generate game analytics, then provide live streaming 770 with real-time analytics, recorded replays 780 with analytics, and any other replay and share functionalities 760.

Although NEX device 750 as shown in FIG. 7 serves as the core for a NEX platform 700, in some embodiments, NEX platform 700 may be networked among multiple user devices, where a NEX server implemented according to the embodiment shown in FIG. 3 may be connected to multiple camera-enabled user computing devices implemented according to the embodiment shown in FIG. 2, and each used to capture game data, and for providing game analytics. Such game video and/or analytics data may be uploaded to the NEX server, which in term may store and facilitate sharing of such data among individual players/users and teams.

Exemplary Convolutional Neural Networks (CNNs) for Pose Estimation

Figure 8A:
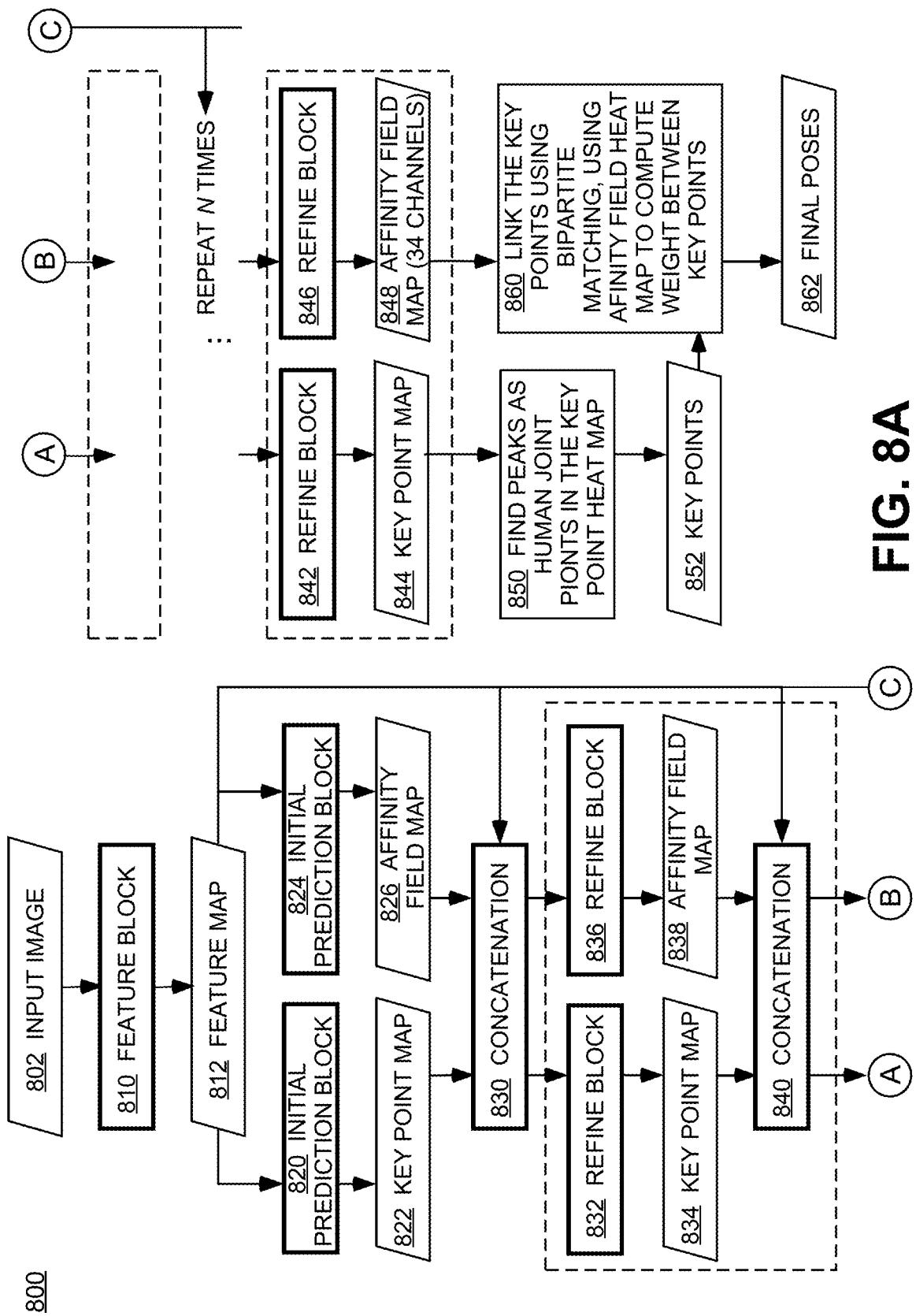
FIG. 8A is a block diagram of an exemplary neural network for pose estimation, according to exemplary embodiments of the present invention.

FIG. 8A is a block diagram 800 of an exemplary neural network for pose estimation, according to some embodiments of the present invention. Here neural network layers or blocks are drawn with thickened lines. In this illustrative example, a two-branch CNN efficiently detects poses of multiple people in an input image by predicting part confidence maps for body parts, and part affinity fields for body part-to-body part association, effectively decoupling the detection of a body part such as an arm or leg, and the assignment of the detected body part to an individual person. A part affinity field (PAF) is a 2D vector field that encodes the location and orientation of body parts including limbs over the image domain. A PAF encodes the association between body parts, where body parts belonging to the same person are linked.

The illustrative network shown in FIG. 8A performs the following steps to estimate the pose of one or more persons in an input image:
1. Use a convolutional network block as a feature extractor to compute a feature map from an input image;
2. Turn the feature map into a key point heat map and an affinity field heat map using another convolutional network block;
3. Refine the key point heat map and the affinity field heat map using yet another convolutional network block, and repeat for several times;
4. Use Rectified Linear Units (ReLU), separable convolutional layers and/or batch normalization techniques to improve the accuracy and performance of the network;
5. Compute final poses by linking the key points using the affinity field heat map.

More specifically, an input image 802 is first passed through a feature block 810 to generate a feature map 812. Initial prediction blocks 820 and 824 then extract a key point map 822 and an affinity field map 826, respectively. A concatenation operation 830 is performed before further refinements are carried out in multiple iterations. For each stage of iteration, refine blocks such as 832, 836, 842, and 846 predict refined key point maps such as 834 and 844, and refined affinity field maps such as 838 and 848, respectively. Concatenation operations such as 840 are performed to generate input for the next stage. A total of N refinements may be carried out, where N may be any positive integer. For example, N may equal to 5 in some embodiments of the present invention. After the last refinement stage, key point heat map 844 is examined in step 850 to find peaks as human joint points or key points 852. Such key points may be linked in step 860 to generate final poses 862, by performing bipartite matching using affinity field heat map 848 to compute weights between key points. In this illustrative example, key point map 844 may comprise 18 channels, while affinity field map 848 may comprise 34 channels.

Figures 8B, 8C:
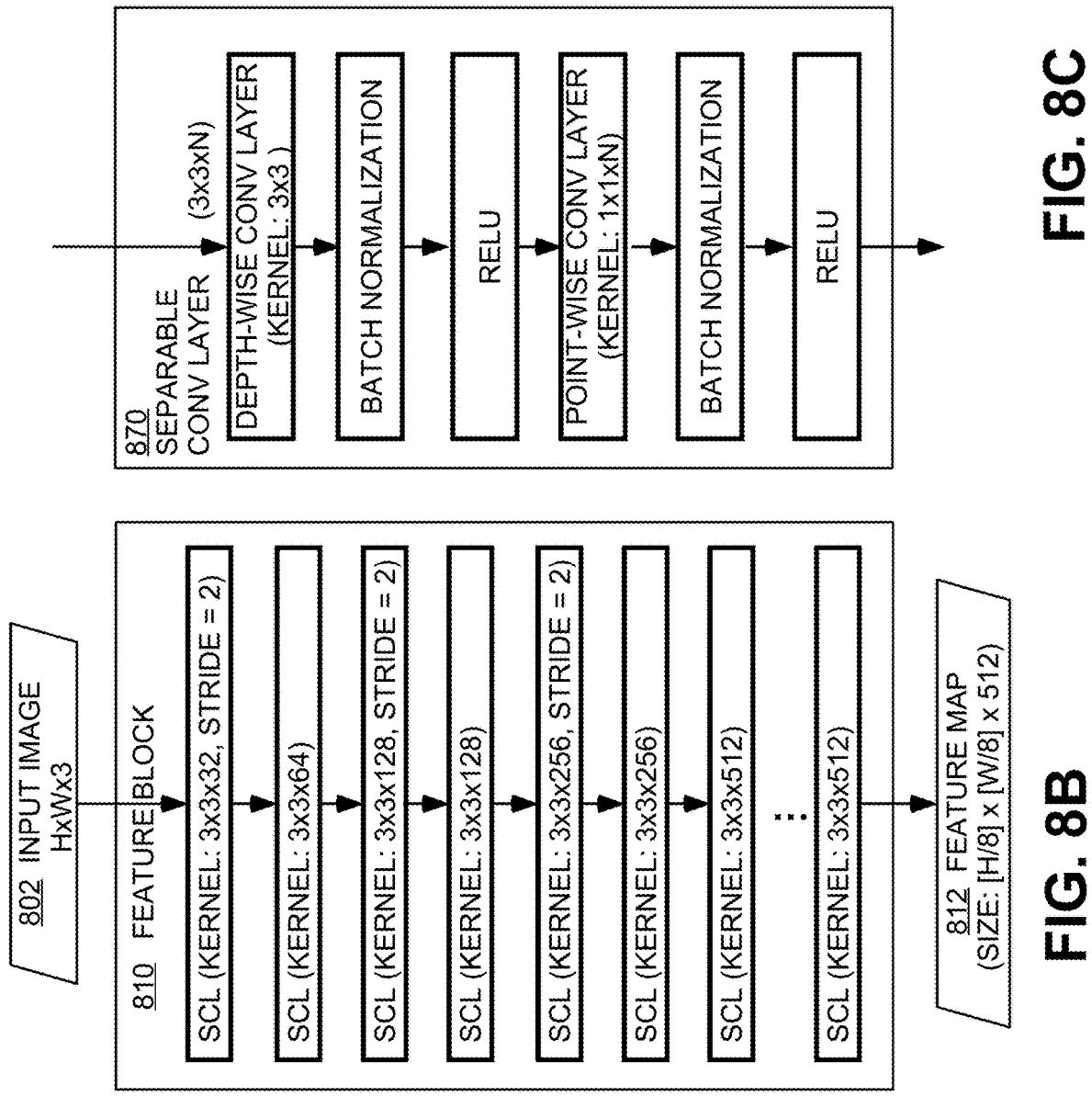
FIG. 8B is a detailed block diagram illustrating an exemplary Feature Block, according to exemplary embodiments of the present invention.
FIG. 8C is a detailed block diagram illustrating an exemplary separable convolutional neural network layer, according to exemplary embodiments of the present invention.

FIG. 8B is a detailed block diagram illustrating an exemplary Feature Block 810, according to some embodiments of the present invention. In this example, separable convolutional layers (SCL) are deployed with different kernel and stride sizes.

Correspondingly, FIG. 8C is a detailed block diagram illustrating an exemplary separable convolutional neural network layer 870, according to some embodiments of the present invention. A depth-wise separable convolution or a separable convolution layer factorizes a conventional, full convolution operation into a first depth-wise convolution to filter the input channels, and a second point-wise convolution to combine outputs of the depth-wise network layer to build a feature map. Depth-wise separable convolutions trade significant improvements in computational efficiency for a small reduction in accuracy. Batch optimization and ReLU blocks further help improve the accuracy and performance of the network layer. Furthermore, in some embodiments, inverted residuals may be utilized to connect linear bottleneck layers between individual depth-wise separable convolutional layers, which also tradeoff computation and accuracy. Linear bottleneck layers reduce the dimensionality of the input, while inverted residuals use shortcut connections between the bottlenecks to enable faster training and better accuracy.

FIG. 8D is a detailed block diagram illustrating an exemplary Initial Prediction Block 820, according to some embodiments of the present invention; FIG. 8E is a detailed block diagram illustrating an exemplary Refine Block 832, according to some embodiments of the present invention. Both comprise multiple separable convolutional layers having different kernel sizes. The input, output, and kernel sizes shown in FIGS. 8B to 8E are for illustrative purposes only, and other similar hyperparameter values may be used in various embodiments of the present invention.

In some implementations of the present invention, one or more of existing software modules may be utilized, including but not limited to, CoreML for CNN object and key point detection, SceneKit for rendering an AR court, and CoreMotion for understanding a mobile device's orientation.

Exemplary Convolutional Neural Networks (CNNs) for Object Detection

A ball game requires a ball and optionally other additional equipment such as a hoop, a backboard, court lines, and the like. The detection of moving and/or static non-human objects from the game video is needed to determine player actions and player analytics.

Figure 9A:
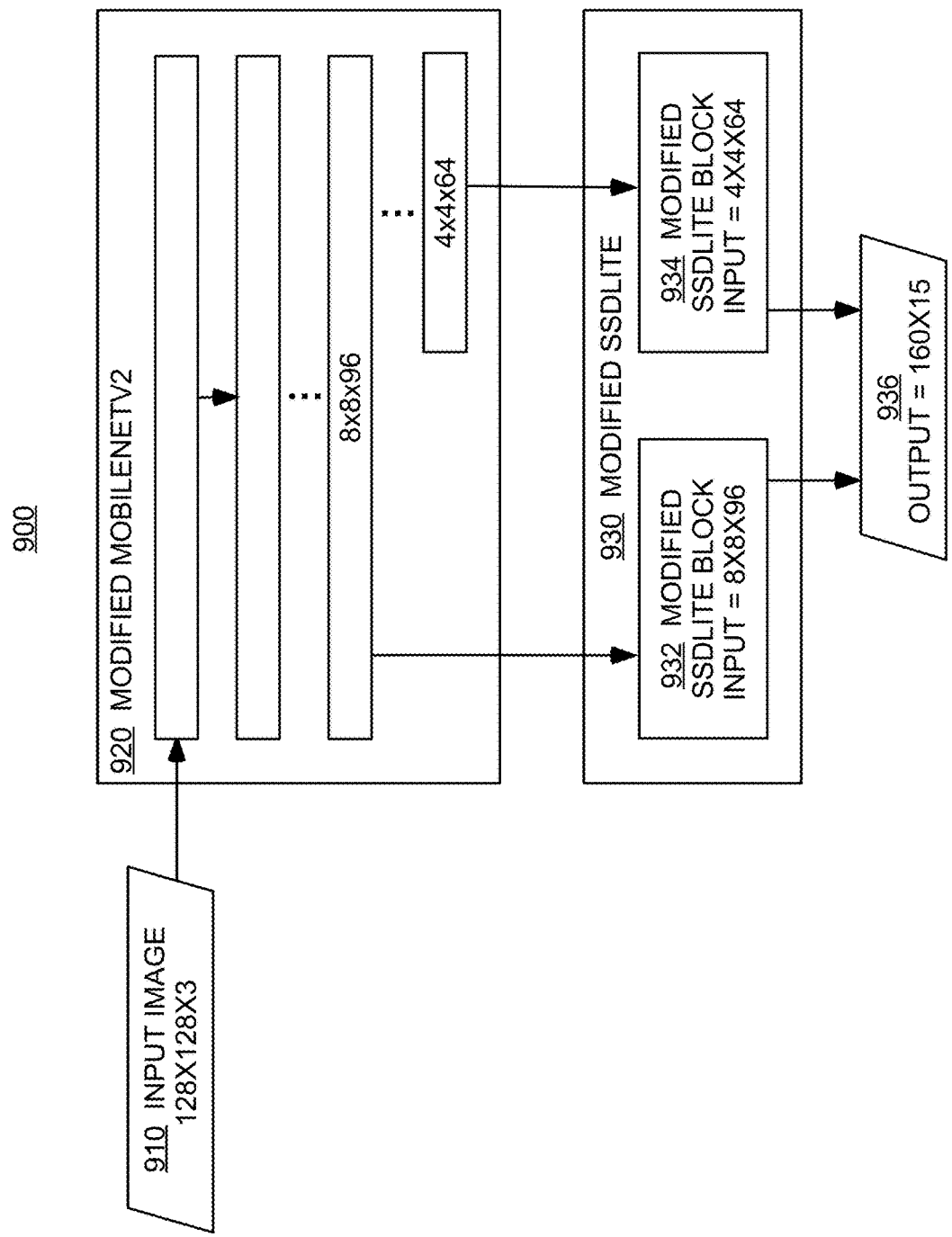
FIG. 9A is a block diagram of an exemplary neural network for ball detection, according to exemplary embodiments of the present invention.
Figure 9B:
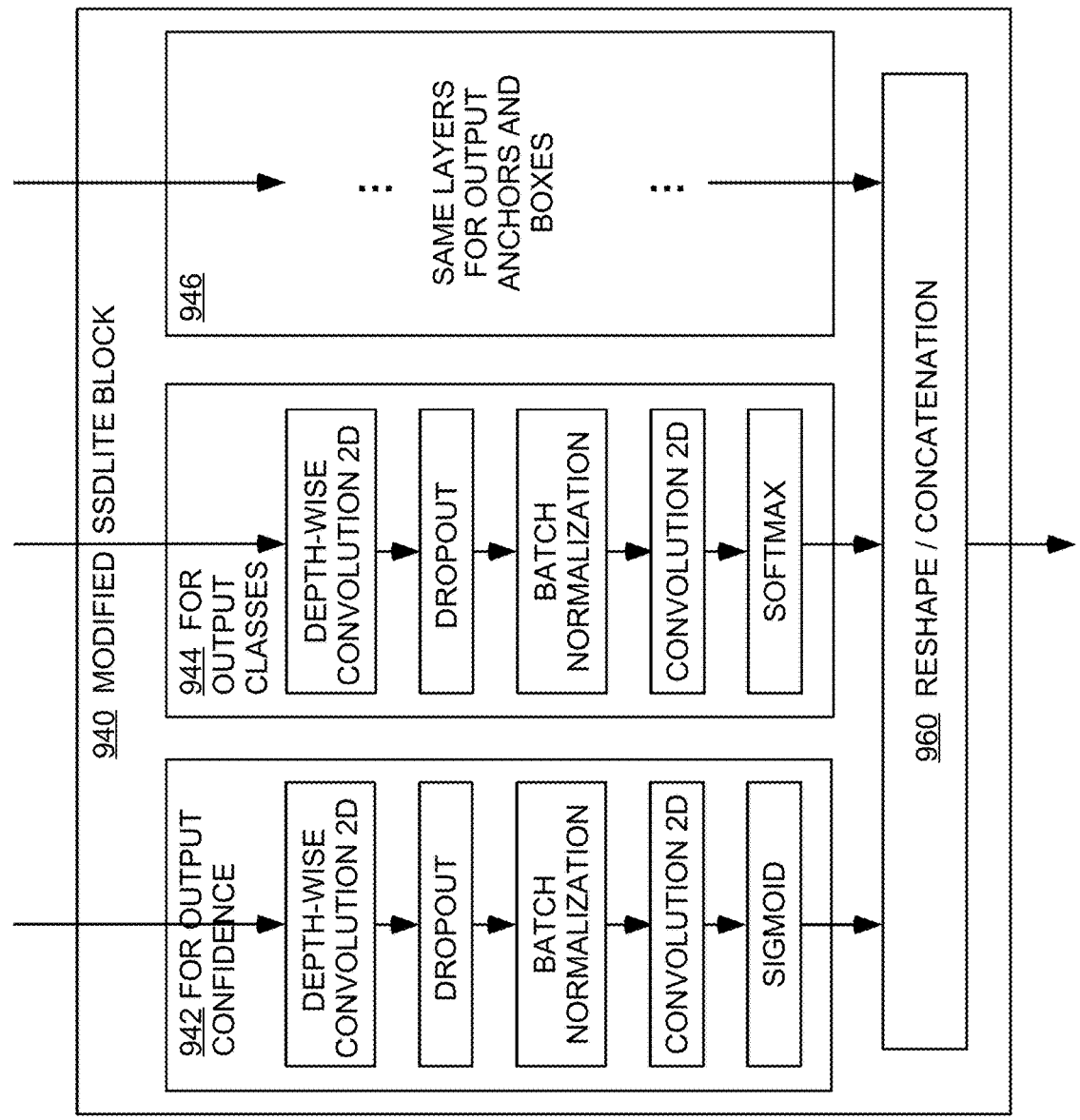
FIG. 9B is a detailed block diagram illustrating an exemplary Modified SSDLite Block, according to exemplary embodiments of the present invention.

FIGS. 9A and 9B are respective block diagrams of an exemplary neural network for ball detection, according to one embodiment of the present invention. This object detector is presented for illustrative purposes only, and some embodiments of the present invention may utilize other computer vision system designs for object detection.

FIG. 9A is a block diagram 900 of an exemplary neural network for ball detection, according to some embodiments of the present invention. In particular, FIG. 9A shows a CNN-based ball detector utilizing an optimized, modified MobileNetV2 framework as a feature extractor and a modified SSDLite framework for multi-scale object detection. An input image 910 is first processed through a Modified MobileNetV2 block 920, the output of which is processed through a Modified SSDLite module 930 comprising two Modified SSDLite blocks 932 and 934, to generate output 936. The input, output, and kernel sizes shown in FIGS. 9A and 9B are for illustrative purposes only, and other similar hyperparameter values may be used in various embodiments of the present invention.

MobileNetV2 is an efficient convolutional neural network design for resource-constrained, mobile device-based computer vision applications. A first key building block of MobileNetV2 is depth-wise separable convolutions, which factorize a conventional, full convolutional operation into a first depth-wise convolution to filter the input channels, and a second point-wise convolution to combine outputs of the depth-wise network layer to build a feature map. Depth-wise separable convolutions trade significant improvements in computational efficiency for a small reduction in accuracy. A second key building block of MobileNetV2 is inverted residuals connecting linear bottleneck layers between individual depth-wise separable convolutional layers, which also tradeoff computation and accuracy. Linear bottleneck layers reduce the dimensionality of the input, while inverted residuals use shortcut connections between the bottlenecks to enable faster training and better accuracy.

Although not shown explicitly in FIG. 9A, in this exemplary embodiment, two MobileNetV2 output layers and 14 bottleneck operators may be used, a non-obvious reduction from the conventional setup with 6 MobileNetV2 output layers and 17 bottleneck operators. Such modifications optimize the feature extraction process to not only reduce the overall computational complexity but also improve the achievable accuracy by tailoring to the specific small input and ball detection goal.

FIG. 9B is a detailed block diagram illustrating an exemplary Modified SSDLite Block, such as 932 or 934 in FIG. 9A, according to some embodiments of the present invention. SSD refers to a Single Shot MultiBox Detector, a multi-object detection framework using a single deep neural network to discretize feature maps into multi-scale bounding boxes. SSD eliminates separate bounding box proposal generation and feature resampling stages to improve computation efficiency without compromising detection accuracy. SSDLite is a mobile-customized variant that utilizes depth-wise separable convolution in SSD prediction layers. Modified SSDLite block 940 shown in the exemplary embodiment of FIG. 9B further tailors and improves the accuracy of SSDLite by adding dropout layers.

More specifically, in Modified SSDLite Block 940, parallel network blocks 942, 944, and 946 are utilized to process the input data separately for output confidence, output classes, and output anchors and bounding boxes. Each block has the same architecture, comprising a depth-wise convolution in 2D space, dropout, batch normalization, further convolution, and a functional operation for classification. Feature maps thus generated are reshaped and/or concatenated via processing block 960 to generate output data.

For the ball detection task, two positive object classes may be considered: "ball" and "ball-in-hand." With conventional SSD or SSDLite framework, a single softmax function may be used to activate among background (e.g., no positive), and these two classes. By comparison, Modified SSDLite Block 940 is designed so that it may classify a ball out of a background, but does not always classify between ball and ball-in-hand for some training data. Such a design takes into account several factors. First, ball and ball-in-hand are not always distinguishable, even for a human. In addition to motion blur, background and other objects such as leg, arm, other people in the background could look like a hand in terms of shape and/or color. Second, having a classifier distinguish between ball and ball-in-hand may not always be worthwhile and may even compromise detection accuracy since there are "gray areas" where an input may be classified either way. Instead, within Modified SSDLite Block 940, a sigmoid function is used to produce confidence levels of whether a ball is present against a background, while a softmax function is used to classify between ball and ball-in-hand, or two output classes instead of three output classes for conventional SSD/SSDLite frames. As a further reduction to computational complexity, loss function and/or back propagation may be disabled if a given training case is in the "gray area."

3D Ball Trajectory Reconstruction with On-Ground Trajectory Lines

To generate shot analytics such as release angle and speed, and game analytics such as shot attempt statistics, ball position and motion sequences may be extracted from an input monocular video using techniques described with reference to FIGS. 9A and 9B, and grouped based on spatial and temporal characteristics to establish 2D ball flows and/or trajectories. As discussed previously, a ball flow refers to a time-sequence of ball positions as traversed by a ball. A ball trajectory refers to a path in space that the ball flies along after being thrown by a shooter, possibly towards a goal, such as a hoop in basketball games. Thus, a ball flow for a shot and a ball trajectory of the shot can be viewed as equivalent and used interchangeably. While an extracted 2D trajectory may be traced in the forward or backward direction to determine shot attempt results and shooter foot locations, more sophisticated game and shot analytics such as ball release angle and speed require the reconstruction of the ball trajectory in 3D space.

Figure 10:
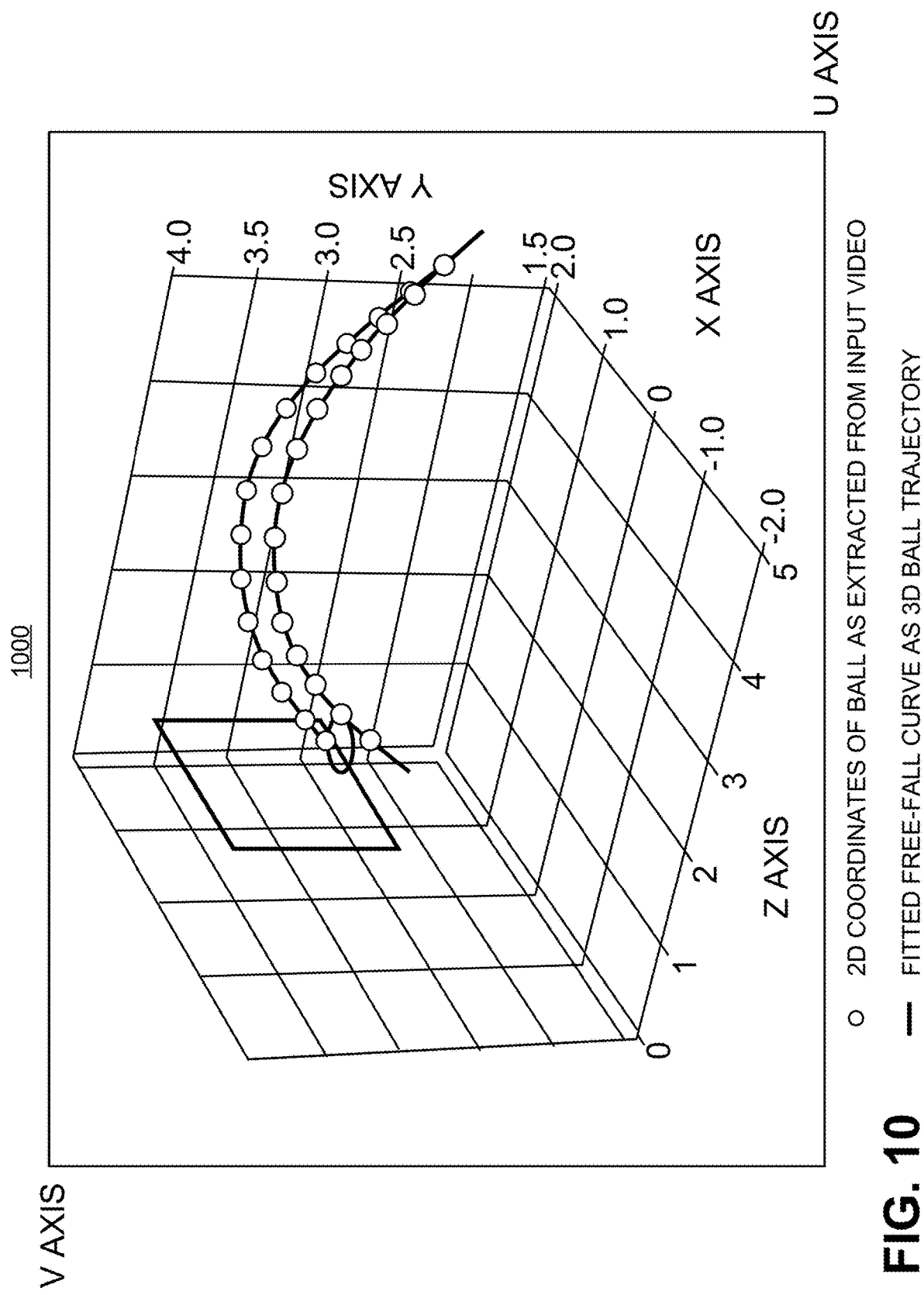
FIG. 10 is an illustrative schematic showing reconstructed 3D ball trajectories, according to some embodiments of the present invention.

FIG. 10 is an illustrative schematic 1000 showing two reconstructed 3D ball trajectories, according to some embodiments of the present invention. In this illustrative example, 2D coordinates of balls in the image domain, as extracted from the input video, are labeled as circular dots, and drawn within the (u,v) image coordinates. Two reconstructed 3D ball trajectories are shown in the (x, y, z) 3D coordinates as solid curves that interpolate the ball's in-air positions. In this particular example, free-fall parabolic curves are fitted to the 2D ball locations. The two 3D trajectories are initiated at the same location, but towards slightly different shooting directions. As a result, both traverse the court towards the hoop and both end in close proximity to the hoop, but it is clear from visual inspection that only the top trajectory leads to a successful shot, while the bottom one is a missed shot.

To reconstruct a 3D ball trajectory, a novel approach is to rely on the use of on-ground ball locations or projections, especially when implemented on resource-limited mobile computing devices. Once the ball leaves the shooter's hands, it is in projectile motion along a parabolic trajectory under the influence of gravity only, assuming air resistance is negligible. That is, the ball experiences a downward acceleration only, with the horizontal component of its velocity staying constant under inertia. Thus, the projection of the ball on the ground plane moves approximately on a straight line at a constant speed. Based on this characteristic of the ball's movement during a shot attempt, multiple "on-ground trajectory lines" may be hypothesized, each enumerating an assumption on the direction of the ball's movement, from the player's shooting position, and each having inherent depth information in the hypothesized movement direction.

In this disclosure, an "on-ground" ball location or projection point refers to the on-ground projection of a ball position along the 3D trajectory. For example, for a ball location $(x_0, y_0, z_0)$ in free space, the corresponding on-ground location is the projection $(x_0, 0, z_0)$, where the y-axis is assumed to lie in the vertical direction perpendicular to the ground plane.

Figure 11:
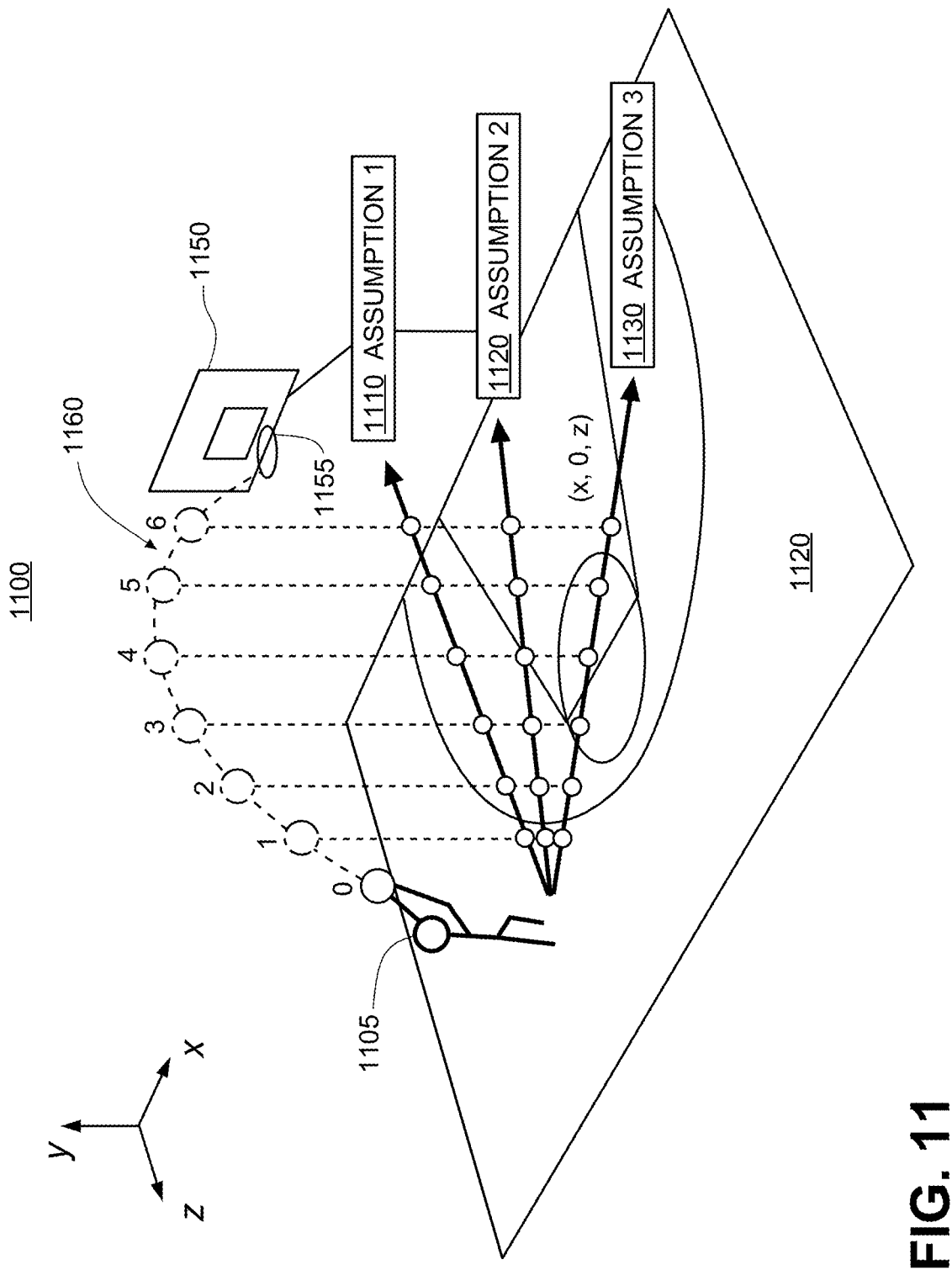
FIG. 11 is an illustrative schematic showing on-ground trajectory lines along different shooting directions, when a corresponding 3D ball trajectory has significant x-axis changes, according to some embodiments of the present invention.

FIG. 11 is an illustrative schematic 1100 showing three on-ground trajectory lines 1110, 1120, and 1130, along three slightly different shooting directions from a shooter 1105. In this example, the mobile device used to capture player action and ball movement is fixed during the ball shot attempt, when a ball flies along a trajectory 1160 from shooter 1105 towards a goal 1150 having a hoop 1155. Schematic 1100 is a superposition of multiple consecutive video frames along 7 discrete time instances starting from a time t=0, with in-air ball positions drawn directly along trajectory 1160.

As stated previously, an on-ground trajectory line refers to a projection of a ball's 3D trajectory onto the ground level, and is a set of sampled projection points that when connected on the ground or in the 2D image plane, forms a line from the shooter's foot location towards the general direction of the goal. As consecutive, individual frames of the video are taken at uniform intervals, projection points within the on-ground trajectory line may be evenly distributed, spaced approximately equally apart, or proportionally to the frame sampling intervals, if air resistance is ignored (a reasonable assumption in most contexts).

In FIG. 11, each on-ground trajectory line 1110, 1120, and 1130 represents a slightly different shooting direction, and each comprises 7 on-ground projection points having 3D coordinates (x, 0, z). 2D coordinates of these projection points may be obtained by drawing straight vertical projection lines from sampled points on trajectory 1160 to the trajectory line assumption and examining the intersection points.

In some embodiments, the different directions may be measured by an angle relative to the z-axis along a sideline of the court area, such as 30°, 45°, 60°, 75°, 90°, etc. The number and direction or degree of on-ground trajectory line assumptions may be based on a computational power of the computing device carrying out the 3D trajectory reconstruction process, or a desired limit on tolerable delay for real-time analytics generation. In addition, feasible shooting directions may be estimated from the shooter's location relative to the hoop, and/or depending on a shooting direction as estimated from a shooter posture.

Once an on-ground trajectory line assumption is established, 2D coordinates of the trajectory points in the image space may be converted into its corresponding 3D coordinates with zero in-air height, using the camera projection matrix. To determine which one of the on-ground projection line assumption is closer to the truth, reproduction errors may be compared, where different in-air heights are cross-compared and verified against vertical positions of the ball within the image plane.

More specifically, a 2D ball trajectory and the shooter's on-ground foot location in the 2D image space can be extracted using computer vision techniques, where the ball's 2D locations within the image space may be represented by a positional vector (u[t], v[t]), where t is a discrete time variable, for example sampled at the frame rate of the input video, or at a lower rate to reduce processing overhead. A camera projection matrix P may be derived and made available as an input to the 3D trajectory reconstruction process. The on-ground locations or projection points (x[t], 0, z[t]) of the ball suffice to provide an in-air 3D trajectory curve (x[t], y[t], z[t]), by using the camera projection matrix, and the following Algorithm 1. Note that each variable in Algorithm 1 may be a function of discrete time variable t.

Algorithm 1: Compute the 3D location (x, y, z) of a ball
  Input:
    A) On-ground locations of a ball, (x, 0, z)
    B) Image locations of the ball, (u, v)
    C) Camera projection matrix P
  Determine a guessed y' such that:
    When projecting (x, y', z) onto the image domain using projection matrix P to obtain resulting coordinates (u', v'), v' and v are as close as possible
  Output:
    The best y' as the in-air height y of the ball In Algorithm 1, it would be understood by persons of ordinary skill in the art that the possible range of y is lower bounded by zero, and upper bounded by a pre-defined value, such as twice the height of the basketball hoop. The determination of the best y' may be carried out by an appropriate search algorithm, such as but not limited to, binary search.

Figure 12:
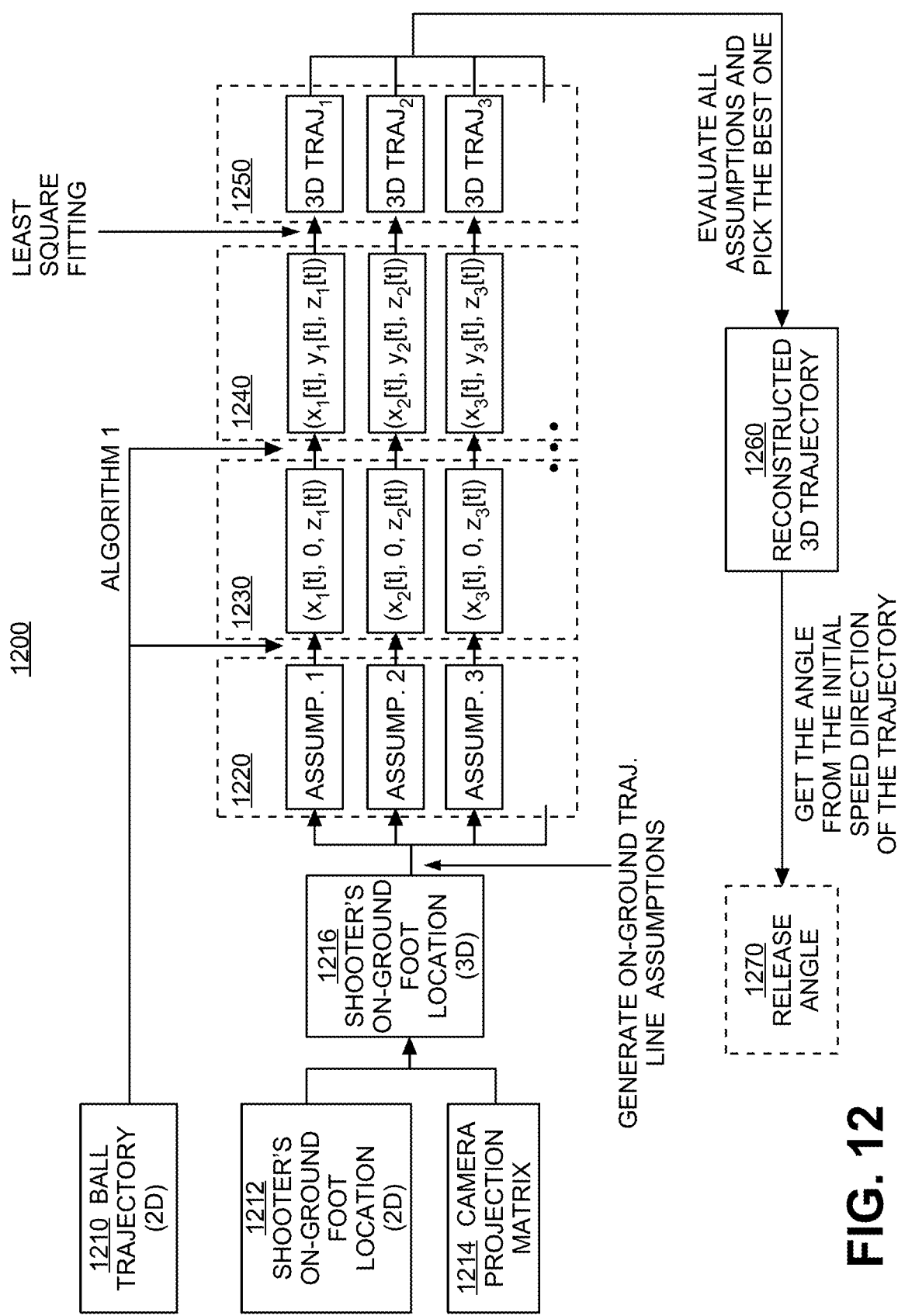
FIG. 12 is a flow diagram of an illustrative process for 3D ball trajectory reconstruction, according to some embodiments of the present invention.

FIG. 12 shows a flow diagram 1200 of an illustrative process for 3D ball trajectory reconstruction and shot analytics generation, when ball movements have significant x-axis changes, according to some embodiments of the present invention. Here, the x-axis is parallel to the end line, the z-axis is parallel to the sidelines, and a shot made from the wing and corner areas would have significant x-axis changes. With an input shooter's on-ground foot location 1212 in 2D image space and a camera projection matrix 1214, the shooter's on-ground foot location 1216 in 3D space may be determined. For example, using the shooter's 2D on-ground foot location 1212 and camera projection matrix 1214, a 3D ray may be derived, then intersected with the ground plane to determine shooter's 3D on-ground foot location 1216 as the intersection point. Based on shooter's 3D on-ground foot location, a total of n on-ground trajectory line assumptions 1220 may be generated, along n different directions from the shooter, optionally towards a goal, where n is an integer greater than 1. 2D ball trajectory 1210 may then be utilized together with on-ground trajectory line assumptions 1220 to determine on-ground locations or projection points $(x_i[t], 0, z_i[t])$ 1230, where t is a discrete time index, and $i \in \{1, \ldots, n\}$ is an index enumerating the different trajectory line assumptions. Next, Algorithm 1 may be applied to determine corresponding 3D locations $(x_i[t], y_i[t], z_i[t])$ 1240, and curve fitting to a quadratic function may be carried out to obtain individual candidate 3D trajectories 1250. For example, a ball projectile motion trajectory may be described with the formula $s+v^*t+\frac{1}{2}^*a^*t^2$, where s is a displacement vector that represents the player's shooting position, v is a velocity vector, a is acceleration due to gravity, and t is a time variable. In some embodiments, curve fitting may be done in the vertical direction for in-air ball heights only to simplify vector computations to scalar computations.

Such candidate 3D trajectories may be evaluated using a trajectory measure or score, and the one having a best score may be chosen as a reconstructed 3D trajectory 1260. For example, in some embodiments, a back-projection error is computed for each candidate 3D trajectory and the one with the lowest error is selected. That is, 3D points are sampled from the curve-fitted trajectory, back-projected to the image domain using the camera projection matrix, and a sum of the L2-norm distances between back-projected points and original image points is computed. In some embodiments, gravity errors are used as trajectory scores, where the gravitational acceleration is estimated from the curve fitting step, and the candidate trajectory having an acceleration closest to the true value is selected.

Moreover, to determine whether an on-ground line assumption and corresponding reconstructed 3D trajectory is reasonable, several criteria may be taken into account, including, but not limited to: whether the gravity of the candidate trajectory is in a reasonable range, whether the back-projection error to the 2D domain is small enough, and whether the candidate trajectory is going towards the basket, where the minimum distance between the basket and the trajectory is below a given threshold. As described above, numerical trajectory scores may be computed based on one or more such criteria. Alternatively, a most reasonable on-ground line assumption may be chosen based on a trajectory line score, and used to reconstruct the 3D trajectory.

Once 3D trajectory 1260 is determined, it may be used subsequently for shot analytics generation. For example, the initial and speed direction of the trajectory may optionally be used to compute a release angle 1270 of the shot.

Figure 13B:
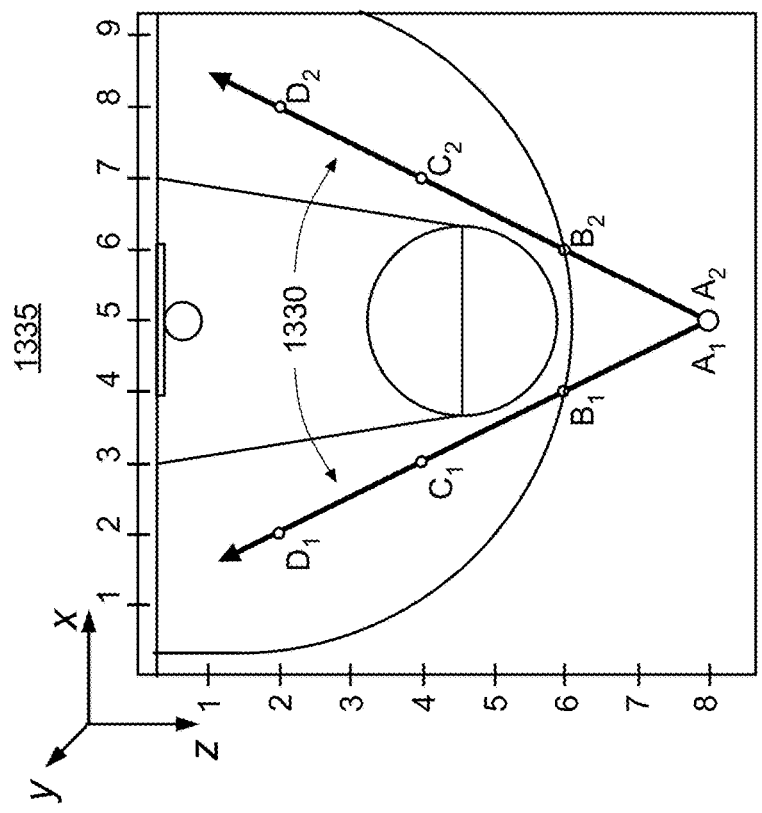
FIG. 13B is a bird's-eye view of the on-ground trajectory lines in FIG. 13A.
Figure 13A:
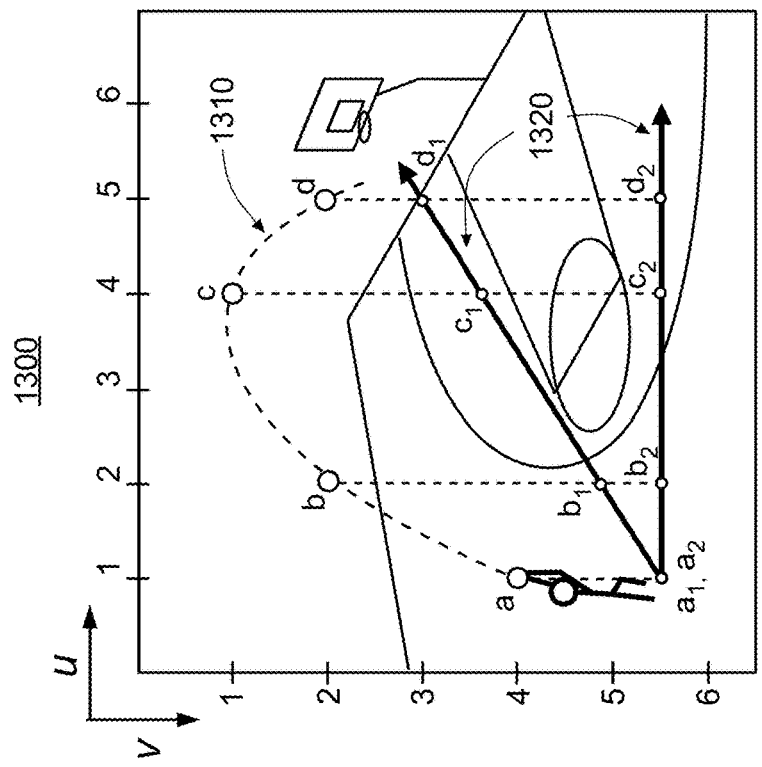
FIG. 13A is an illustrative example showing on-ground trajectory lines in the image plane of an input video of a basketball shot, according to some embodiments of the present invention.
Figure 13C:
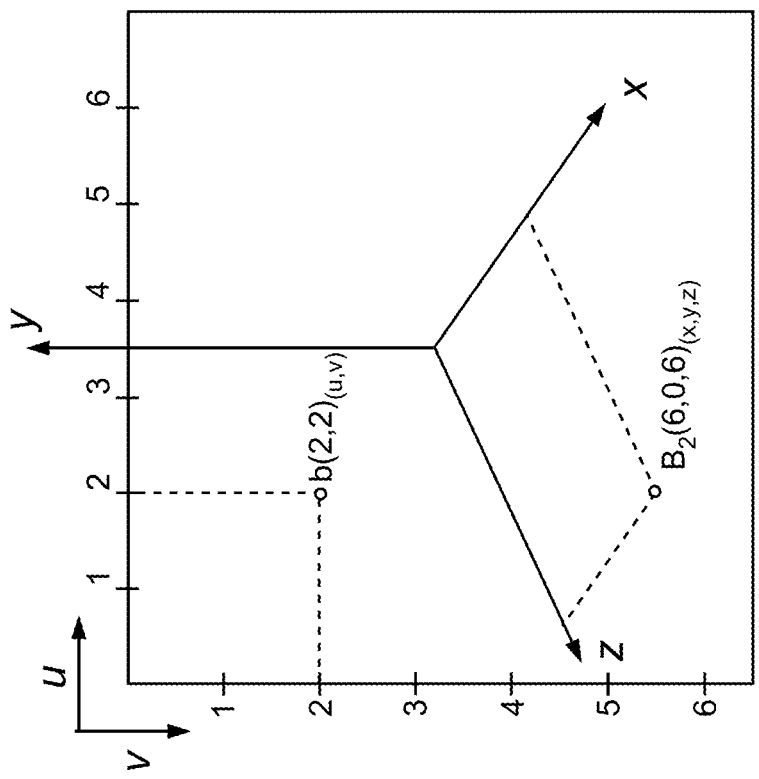
FIG. 13C is an illustrative example showing a step in the process of reconstructing a 3D trajectory from the 2D trajectory in FIG. 13A.

FIGS. 13A, 13B, and 13C show a numerical example illustrating intermediate process step results in FIG. 12. In particular, FIG. 13A is an illustrative diagram 1300 showing two on-ground trajectory lines in the image plane of an input video of a basketball shot; FIG. 13B is a bird's eye view 1335 of the on-ground trajectory line assumptions in FIG. 13A; FIG. 13C shows one application 1345 of Algorithm 1 in determining a 3D coordinate B for a trajectory point b in FIG. 13A.

More specifically, in FIG. 13A, a ball trajectory 1310 in the 2D (u, v) image plane is provided as an input, represented by four trajectory points a (1, 4), b (2, 2), c (4, 1), and d (5, 2). Also given is a shooter foot location (1, 5.5). Embodiments of the present invention tries to reconstruct a corresponding 3D trajectory by computing corresponding (x, y, z) coordinates A, B, C, and D in 3D free space. In this example, lower case letters represent points in 2D image space with (u, v) coordinates, and corresponding upper-case letters represent the same points in 3D free space with (x, y, z) coordinates.

Two on-ground trajectory line assumptions 1320 are postulated in this example, each from the shooter's foot location towards the goal, but pointing to a slightly different direction. Corresponding 3D on-ground trajectory lines 1330 may be calculated for respective 2D on-ground trajectory lines 1320, as camera calibration and court rectification have been previously carried out. That is, for any on-ground point, its 3D coordinates in free-space may be computed from its 2D coordinates in the image plane.

Next, Algorithm 1 may be performed for each on-ground projection point within each on-ground trajectory line assumption. In FIG. 13C, given an on-ground trajectory projection point $B_2$ having (x, y, z) coordinates (6, 0, 6) corresponding to a trajectory point b(2, 2), different in-air ball heights may be tried, where a projection back into the 2D image space allows comparison to or verification against point b's position in the image domain, and a best fitting in-air height may be chosen to obtain point B(6, 4, 6) 1340. Once in-air ball heights for every on-ground projection point is estimated for an on-ground trajectory line assumption, curve fitting of these 3D points to a parabolic projectile may be performed, as discussed previously.

Figure 14:
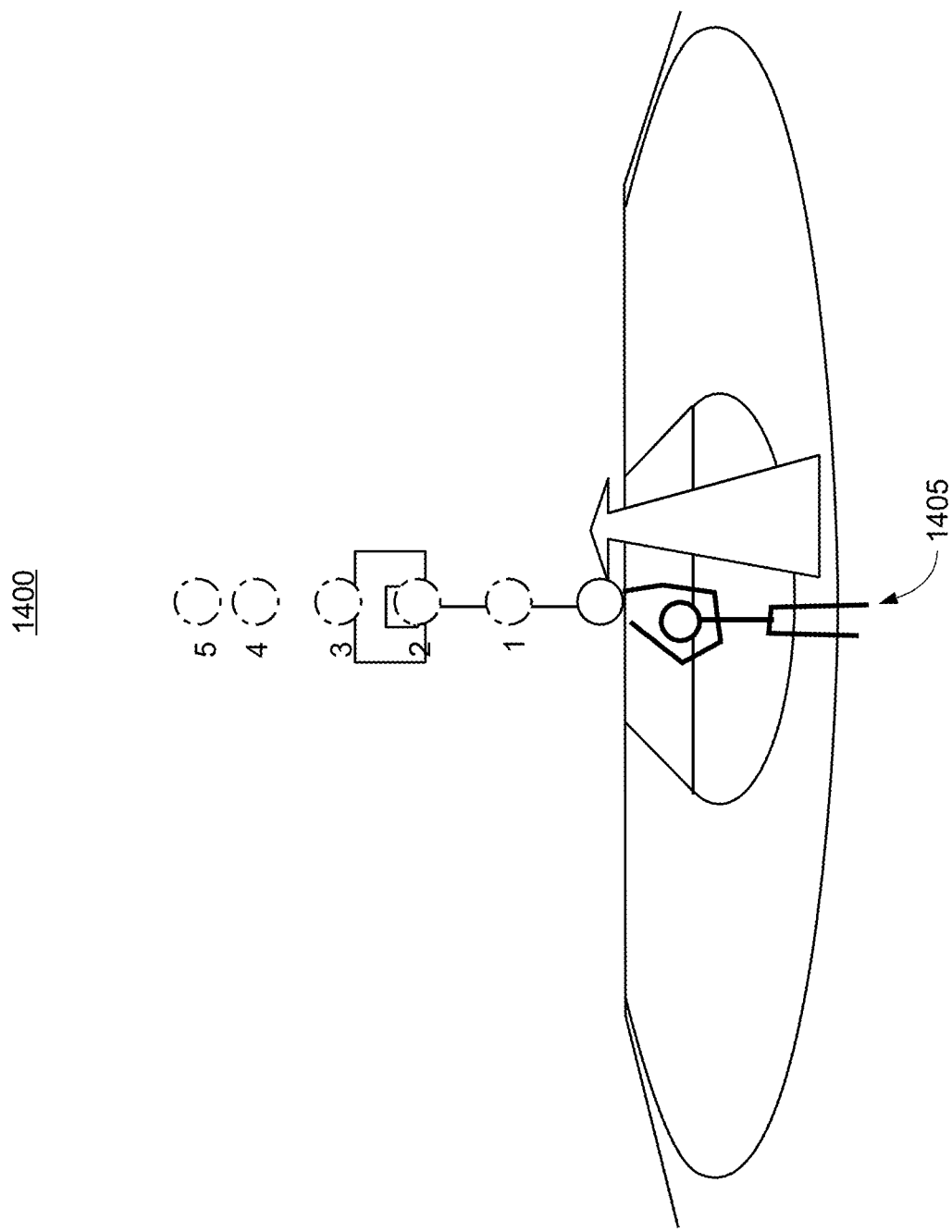
FIG. 14 is an illustrative schematic showing ball positions sampled along a 3D ball trajectory that does not have significant x-axis changes, according to some embodiments of the present invention.

While the scenario in FIGS. 11, 13A, 13B, and 13C happens more common in basketball game video capturing, FIG. 14 shows an exception, where the shot is made at a position along a direct line between the camera and the goal, and where the 3D ball trajectory does not have significant lateral positional changes tangent to this direct line. In this example, the 3D ball trajectory does not have significant x-axis changes. In particular, FIG. 14 is an illustrative schematic 1400 showing five different ball positions sampled along a 3D ball trajectory, according to some embodiments of the present invention. In this scenario, player 1405 is shooting from the key area, facing directly towards the hoop, while the camera is also positioned directly facing the hoop. The shooting direction is perpendicular to the hoop backboard, with the x-coordinate of each trajectory point known. The captured 2D ball trajectory is therefore straight up and down. In this special case, depth information is inherent in the speed at which the ball travels from the shooter towards the hoop, with the 3D ball trajectory decided by the angle at which the ball was released, as well as the speed of the ball in air.

Figure 15:
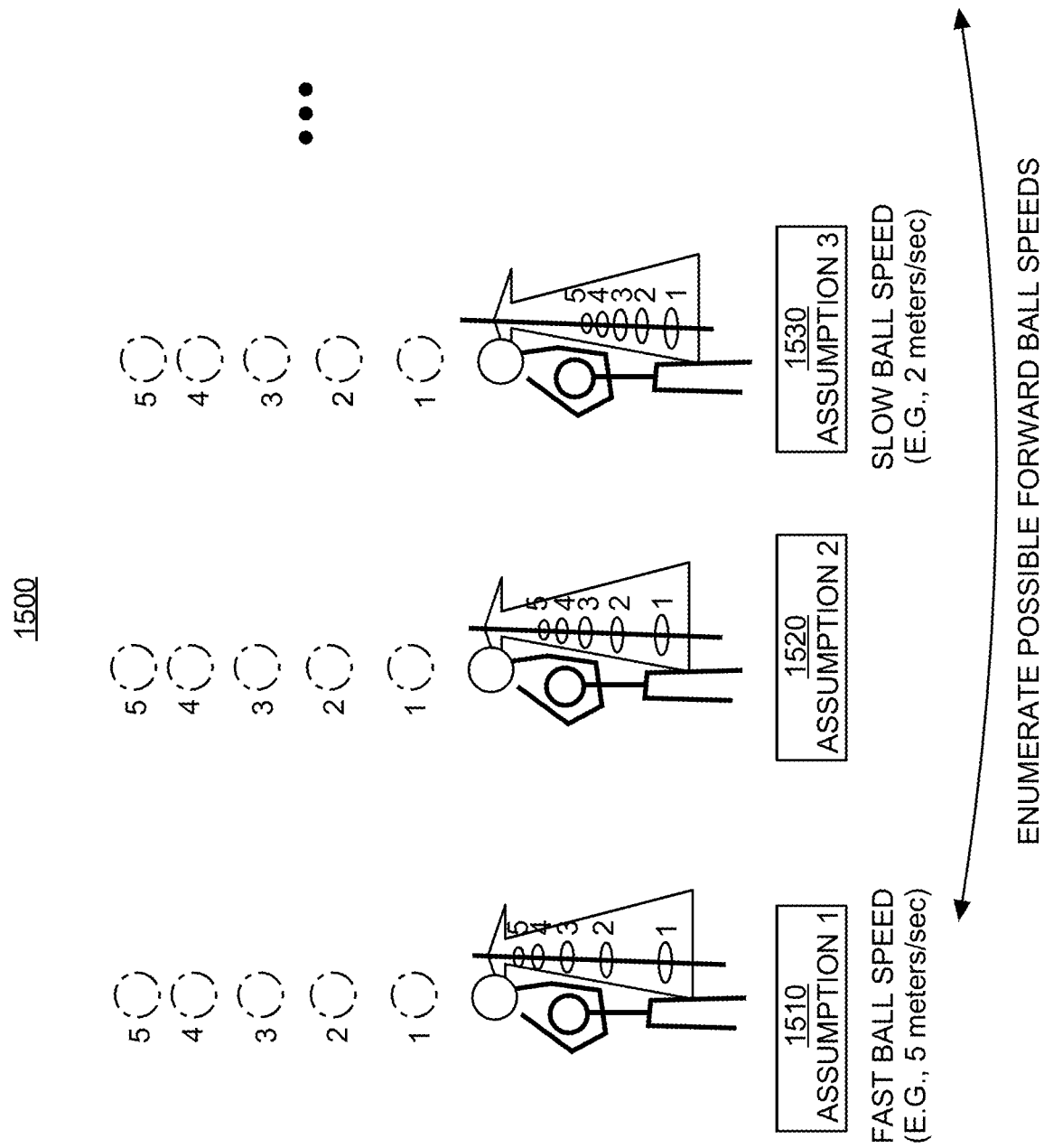
FIG. 15 is an illustrative schematic showing ball positions sampled along the 3D ball trajectory shown in FIG. 14, enumerating different ball forward speeds, according to some embodiments of the present invention.

Correspondingly, FIG. 15 is a schematic 1500 illustrating ball positions sampled along the 3D ball trajectory in FIG. 14, enumerating different ball forward speeds, according to some embodiments of the present invention. In this special case where the 3D ball trajectory does not have significant lateral or x-axis changes, on-ground trajectory line assumptions such as 1510, 1520 and 1530 are each represented as a vertical straight line, where projection points are spaced further apart for a faster ball speed under assumption 1510, and close together for a slower ball speed under assumption 1530.

Figure 16:
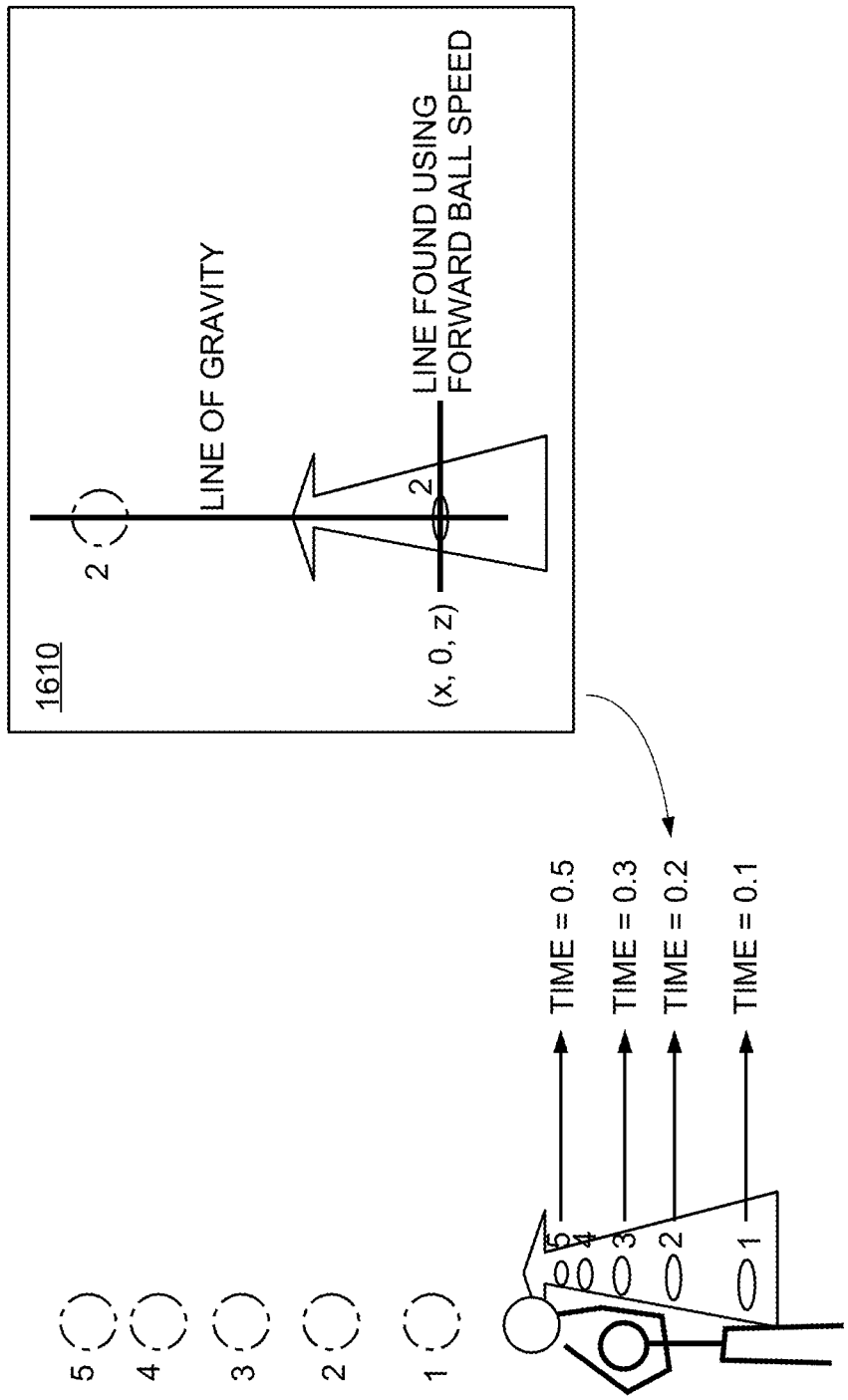
FIG. 16 is a schematic showing how on-ground ball positions are estimated in FIG. 15, according to some embodiments of the present invention.

FIG. 16 is a schematic 1600 showing how on-ground ball positions or trajectory points may be estimated in FIG. 15, according to some embodiments of the present invention. In particular, the z location of an on-ground trajectory point may be found by using image-domain line intersection of the gravity line and a horizontal line estimated using enumerated ball forward speeds at different time instances. This process is illustrated for the ball position at t=0.2 in box 1610. Note that ball forward speeds are bounded by the physical strength of the player and the distance between the shooter and the hoop.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skill in the art would appreciate that the system necessarily includes these components. A computing device, as illustrated in FIG. 2, is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A method for reconstructing a 3D ball trajectory, comprising:
   receiving a 2D trajectory in a 2D image space, a shooter's on-ground foot location, and a camera projection matrix;
   generating a plurality of on-ground trajectory lines based on the shooter's on-ground foot location and the 2D trajectory, wherein each on-ground trajectory line comprises a plurality of on-ground projection points, and wherein each on-ground projection point represents an on-ground projection of a 3D ball position;
   for each on-ground trajectory line:
      determining a plurality of ball heights from a ground plane for the plurality of on-ground projection points, wherein the plurality of ball heights and the plurality of on-ground projection points define a plurality of candidate 3D ball positions, and
      curve fitting the plurality of candidate 3D ball positions to reconstruct a corresponding candidate 3D trajectory; and
   reconstructing the 3D ball trajectory by selecting a candidate 3D trajectory with a best trajectory score.

2. The method of claim 1, further comprising:
   determining the 2D trajectory in the 2D image space from an input video.

3. The method of claim 2, wherein the input video was captured using a camera on a mobile computing device.

4. The method of claim 1, wherein each of the plurality of on-ground trajectory lines enumerates a possible shooting direction from the shooter's foot location towards a goal.

5. The method of claim 1, wherein each of the plurality of on-ground trajectory lines enumerates a possible ball speed.

6. The method of claim 1, wherein each candidate 3D ball position in each candidate 3D trajectory, when projected onto the 2D image space, is within a threshold distance to a corresponding position of the ball in 2D image space.

7. The method of claim 1, wherein each ball height is determined by a search algorithm.

8. The method of claim 1, wherein the trajectory score is computed based on a back-projection to the 2D image space.

9. The method of claim 1, further comprising:
   detecting a goal, using a Convolutional Neural Network (CNN) module, by detecting one or more key feature points of the goal from the input video, wherein the CNN module has been trained using one or more prior input videos, and wherein each on-ground trajectory line is directed towards the goal.

10. A system for reconstructing a 3D ball trajectory, comprising:
    at least one processor; and
    a non-transitory physical medium for storing program code and accessible by the processor, the program code when executed by the processor causes the processor to:
       receive a 2D trajectory in a 2D image space, a shooter's on-ground foot location, and a camera projection matrix;
       generate a plurality of on-ground trajectory lines based on the shooter's on-ground foot location and the 2D trajectory, wherein each on-ground trajectory line comprises a plurality of on-ground projection points, and wherein each on-ground projection point represents an on-ground projection of a 3D ball position;
       for each on-ground trajectory line:
          determine a plurality of ball heights from a ground plane for the plurality of on-ground projection points, wherein the plurality of ball heights and the plurality of on-ground projection points define a plurality of candidate 3D ball positions, and curve fit the plurality of candidate 3D ball positions to reconstruct a corresponding candidate 3D trajectory; and reconstruct the 3D ball trajectory by selecting one of the candidate 3D trajectories with a best trajectory score.

11. The system of claim 10, wherein the program code when executed by the processor further causes the processor to:

determine the 2D trajectory in the 2D image space from an input video.

12. The system of claim 11, wherein the input video was captured using a camera on a mobile computing device.

13. The system of claim 10, wherein each of the plurality of on-ground trajectory lines enumerates a possible shooting direction from the shooter's foot location towards a goal.

14. The system of claim 10, wherein each of the plurality of on-ground trajectory lines enumerates a possible ball speed.

15. The system of claim 10, wherein each candidate 3D ball position in each candidate 3D trajectory, when projected onto the 2D image space, is within a threshold distance to a corresponding position of the ball in 2D image space.

16. The system of claim 10, wherein each ball height is determined by a search algorithm.

17. The system of claim 10, wherein the trajectory score is computed based on a back-projection to the 2D image space.

18. The system of claim 10, wherein the program code when executed by the processor further causes the processor to:

detect a goal, using a Convolutional Neural Network (CNN) module, by detecting one or more key feature points of the goal from the input video, wherein the CNN module has been trained using one or more prior input videos, and wherein each on-ground trajectory line is directed towards the goal.

19. A non-transitory physical storage medium for reconstructing a 3D ball trajectory, the storage medium comprising program code stored thereon, the program code when executed by the processor causes the processor to:

receive a 2D trajectory in a 2D image space, a shooter's on-ground foot location, and a camera projection matrix;

generate a plurality of on-ground trajectory lines based on the shooter's on-ground foot location and the 2D trajectory, wherein each on-ground trajectory line comprises a plurality of on-ground projection points, and wherein each on-ground projection point represents an on-ground projection of a 3D ball position;

for each on-ground trajectory line:

determine a plurality of ball heights from a ground plane for the plurality of on-ground projection points, wherein the plurality of ball heights and the plurality of on-ground projection points define a plurality of candidate 3D ball positions, and curve fit the plurality of candidate 3D ball positions to reconstruct a corresponding candidate 3D trajectory; and reconstruct the 3D ball trajectory by selecting one of the candidate 3D trajectories with a best trajectory score.

20. The non-transitory physical medium of claim 19, wherein the program code when executed by the processor further causes the processor to:

determine the 2D trajectory in the 2D image space from an input video.

* * * * *